United States Patent
Burke et al.

(10) Patent No.: US 10,841,311 B2
(45) Date of Patent: *Nov. 17, 2020

(54) RULE MANAGEMENT USER INTERFACE

(71) Applicant: Visa International Service Association, San Francisco, CA (US)

(72) Inventors: Keith Burke, Salem, NH (US); Nathan Wood, Medford, MA (US); Sanjeeva Kumar, Dublin (IE)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,068

(22) Filed: May 30, 2019

(65) Prior Publication Data
US 2019/0281063 A1   Sep. 12, 2019

Related U.S. Application Data

(63) Continuation of application No. 15/289,848, filed on Oct. 10, 2016, now Pat. No. 10,375,078.

(51) Int. Cl.
*H04L 29/06*    (2006.01)
*G06F 16/951*   (2019.01)
(Continued)

(52) U.S. Cl.
CPC ........ *H04L 63/101* (2013.01); *G06F 16/9038* (2019.01); *G06F 16/951* (2019.01);
(Continued)

(58) Field of Classification Search
CPC .................. G06F 17/30864; G06F 17/30991
See application file for complete search history.

(56) References Cited

U.S. PATENT DOCUMENTS

| 6,154,729 A | 11/2000 | Cannon et al. |
| 7,263,506 B2 | 8/2007 | Lee et al. |

(Continued)

FOREIGN PATENT DOCUMENTS

CN   107918738   4/2018

OTHER PUBLICATIONS

"FraudFile (Fact/Data Sheet)", G2 Web Services, [online], Available on internet at: http://www.g2webservices.com/services/fraudprotection/fraudfile, 2014, 2 pages.
(Continued)

*Primary Examiner* — Amir Mehrmanesh
(74) *Attorney, Agent, or Firm* — Kilpatrick Townsend & Stockton

(57) ABSTRACT

Embodiments of the invention are directed to techniques for preventing access to protected resources by unauthorized individuals by enabling an administrator associated with a transport computer to customize filtering rules via a user interface. In some embodiments, a server computer can, from a client computer, receive credentials of the administrator. The credentials can be used to retrieve requesting computers registered with the transport computer. The requesting computers may then be displayed at the client computer. A selection of one of the requesting computers is received from the client computer. A plurality of settings, which represent rules controlling which authorization request messages from the selected requesting computer are forwarded, are displayed at the client computer, wherein one of the settings references one or more attributes that distinguish certain authorization request messages. In response to receiving a selection of the respective setting, modifying the rules in accordance with the plurality of settings.

20 Claims, 15 Drawing Sheets

(51) Int. Cl.
G06F 16/9038 (2019.01)
G06Q 20/40 (2012.01)

(52) U.S. Cl.
CPC ....... *G06Q 20/405* (2013.01); *G06Q 20/4016* (2013.01); *H04L 63/0853* (2013.01); *H04L 63/1425* (2013.01); *H04L 63/20* (2013.01)

(56) References Cited

U.S. PATENT DOCUMENTS

| | | |
|---|---|---|
| 7,433,855 B2 | 10/2008 | Gavan et al. |
| 7,578,438 B2 | 8/2009 | Hogg et al. |
| 7,657,482 B1 | 2/2010 | Shirey et al. |
| 7,717,337 B2 | 5/2010 | Song et al. |
| 8,036,967 B2 | 10/2011 | Adams |
| 8,082,349 B1 | 12/2011 | Bhargava et al. |
| 8,458,069 B2 | 6/2013 | Adjaoute |
| 8,567,669 B2 | 10/2013 | Griegel et al. |
| 9,077,758 B1 * | 7/2015 | McGovern .............. H04L 63/14 |
| 9,420,002 B1 | 8/2016 | Mcgovern et al. |
| 9,813,285 B1 | 11/2017 | Mcgovern et al. |
| 10,375,078 B2 * | 8/2019 | Burke .................. H04L 63/101 |
| 2002/0169720 A1 | 11/2002 | Wilson et al. |
| 2003/0153299 A1 | 8/2003 | Perfit et al. |
| 2007/0039049 A1 | 2/2007 | Kupferman et al. |
| 2008/0162396 A1 | 7/2008 | Kerley et al. |
| 2008/0288382 A1 | 11/2008 | Smith et al. |
| 2008/0298573 A1 | 12/2008 | Monk |
| 2008/0301043 A1 | 12/2008 | Unbehagen |
| 2008/0313047 A1 | 12/2008 | Casares et al. |
| 2009/0192957 A1 | 7/2009 | Subramanian et al. |
| 2009/0259574 A1 | 10/2009 | Thomsen et al. |
| 2009/0307049 A1 | 12/2009 | Elliott, Jr. et al. |
| 2010/0017328 A1 | 1/2010 | Stephen et al. |
| 2010/0094765 A1 | 4/2010 | Nandy |
| 2010/0138340 A1 | 6/2010 | Shirey et al. |
| 2010/0312705 A1 | 12/2010 | Caruso et al. |
| 2011/0000962 A1 | 1/2011 | Chan et al. |
| 2011/0016041 A1 | 1/2011 | Scragg |
| 2011/0016052 A1 | 1/2011 | Scragg |
| 2012/0271743 A1 | 10/2012 | Patel et al. |
| 2012/0278246 A1 | 11/2012 | Boding et al. |
| 2013/0006848 A1 | 1/2013 | Kuttuva |
| 2013/0024371 A1 | 1/2013 | Hariramani et al. |
| 2014/0207673 A1 | 7/2014 | Jeffries et al. |
| 2014/0358789 A1 | 12/2014 | Boding et al. |
| 2015/0120472 A1 | 4/2015 | Aabye et al. |
| 2015/0199679 A1 | 7/2015 | Palanisamy et al. |
| 2016/0092872 A1 | 3/2016 | Prakash et al. |
| 2016/0352739 A1 | 12/2016 | Mcgovern et al. |

OTHER PUBLICATIONS

G2 Web Services Announces Fraud File at MasterCard Risk Management Conference, G2 Web Services Blog, [online], Available on internet at: http://www.g2webservices.com/g2-web-services announcefraudfile-at-mastercard-risk-management-conference, Oct. 22, 2013, 2 pages.

"Industry Insight on Merchant Acquiring Fraud", ACI Payment Systems, [online], Available on internet at: Error! Hyperlink reference not valid.aci_merchant_acquiring_fraud_tl_us_0511_ 4692. ashx, 2011, 4 pages.

Vikram et al., "A Solution Architecture for Financial Institutions to Handle Illegal Activities: A Neural Networks Approach", IEEE, Proceedings of the 37th Hawaii International Conference on System Sciences, Jan. 2004, pp. 1-10.

* cited by examiner

RULE MANAGEMENT USER INTERFACE

CROSS REFERENCE TO RELATED APPLICATIONS

This application is a continuation patent application which claims the benefit of the filing date of U.S. patent application Ser. No. 15/289,848 filed Oct. 10, 2016, which is herein incorporated by reference in its entirety for all purposes.

BACKGROUND

Access to a resource may be granted in response to an authorization request. However, some authorization requests may be malicious or fraudulent. One or more filtering rules may be used to reject the authorization request based on whether conditions of the filtering rules are satisfied. The one or more filtering rules may be established at a node where a stream of authorization requests passes through. An authorization request within the stream of requests may be rejected if parameters of the authorization request satisfy conditions of at least one of the filtering rules at the node. In some cases, one or more clients that are vulnerable to fraudulent requests may rely on the filtering rules for protection.

However, because different clients may encounter different types of fraud, there is a need to provide the each of the clients an intuitive and flexible way to customize filter rules based on the type of fraudulent activity encountered by the client.

Embodiments of the present invention address these problems and other problems individually and collectively.

BRIEF SUMMARY

Embodiments of the invention are directed to techniques for enabling an administrator of a transport computer to customize filtering rules at an authorization server via a user interface. For example, the administrator may interact with the user interface to create a filtering rule that declines requests to access a resource, where the requests are associated with a particular user identifier. The user interface can provide an administrator of a transport computer the ability to customize filtering rules based on the type of fraudulent activity encountered by the transport computer.

One embodiment of the invention is directed to a method that may be performed by a server computer. The method can comprise accessing a database to retrieve a plurality of requesting computers that have been registered with a transport computer, wherein, for each of the plurality of requesting computers, the transport computer may be networked to the requesting computer and configured to process authorization request messages for the requesting computer. The server computer can cause a list of the plurality of requesting computers to be displayed at a client computer. The server computer can receive, from the client computer, a selection from the list of the plurality of requesting computers, thereby providing a selected requesting computer. The server computer can cause a first setting, which represents a rule that controls which authorization request messages from the selected requesting computer are forwarded to the transport computer, to be displayed at the client computer, wherein the first setting references one or more first attributes that distinguish a subset of authorization request messages from other authorization request messages. The server computer can, responsive to receiving a first selection of the first setting from the client computer, access the database to modify the rule in accordance with the first setting. The server computer can receive a first authorization request message that is characterized by one or more second attributes from the selected requesting computer. The server computer can, responsive to receiving the first authorization request message: using the first authorization request message to access a set of rules that control which authorization request messages from the selected requesting computer are forwarded to the transport computer. The server computer can process the first authorization request message in accordance with the set of rules, which comprises processing the first authorization request message in accordance with a first protocol in response to determining that the first authorization request message is characterized by the one or more second attributes, wherein processing the first authorization request message in accordance with the first protocol comprises transmitting an authorization response message to the selected requesting computer without forwarding the first authorization request message to the transport computer.

Another embodiment of the invention is directed to a server computer comprising a processor and a computer-readable medium coupled to the processor. The computer-readable medium can include code executable by a processor for performing a method. The method can comprise accessing a database to retrieve a plurality of requesting computers that have been registered with a transport computer, wherein, for each of the plurality of requesting computers, the transport computer may be networked to the requesting computer and configured to process authorization request messages for the requesting computer. The server computer can cause a list of the plurality of requesting computers to be displayed at a client computer. The server computer can receive, from the client computer, a selection from the list of the plurality of requesting computers, thereby providing a selected requesting computer. The server computer can cause a first setting, which represents a rule that controls which authorization request messages from the selected requesting computer are forwarded to the transport computer, to be displayed at the client computer, wherein the first setting references one or more first attributes that distinguish a subset of authorization request messages from other authorization request messages. The server computer can, responsive to receiving a first selection of the first setting from the client computer, access the database to modify the rule in accordance with the first setting. The server computer can receive a first authorization request message that is characterized by one or more second attributes from the selected requesting computer. The server computer can, responsive to receiving the first authorization request message: using the first authorization request message to access a set of rules that control which authorization request messages from the selected requesting computer are forwarded to the transport computer. The server computer can process the first authorization request message in accordance with the set of rules, which comprises processing the first authorization request message in accordance with a first protocol in response to determining that the first authorization request message is characterized by the one or more second attributes, wherein processing the first authorization request message in accordance with the first protocol comprises transmitting an authorization response message to the selected requesting computer without forwarding the first authorization request message to the transport computer.

Another embodiment of the invention is directed to a method that may be performed by a client computer. The method can comprise receiving a selection from a list of requesting computers, thereby receiving a selected requesting computer. The method can include receiving, from the server computer, a plurality of settings which represent a set of rules that control which authorization request messages from the selected requesting computer are forwarded to a transport computer, wherein the plurality of settings are modifiable and comprise a first setting that references one or more attributes that distinguishes a subset of authorization request messages from other authorization request messages. The method can comprise receiving a first selection of the first setting. The method can comprise transmitting the first selection to the server computer, thereby causing the server computer to modify the set of rules in accordance with the plurality of settings, wherein evaluating the set of rules in response to receiving a first authorization request message that is characterized by the one or more attributes from the selected requesting computer causes an authorization response message to be transmitted to the selected requesting computer without the first authorization request message being forwarded to the transport computer.

In some embodiments, processing the authorization request message in accordance with the first protocol can comprise transmitting an authorization response message to the selected requesting computer without forwarding the first authorization request message to the transport computer. In such embodiments, the authorization response message can indicate that a request to access a resource for which the authorization request message was transmitted is declined.

In some embodiments, the plurality of settings can further comprise a second setting that references user identifiers that are assigned by an resource computer that is associated with the transport computer. In such embodiments, the method can further comprise accessing the database to modify the set of rules in accordance with the plurality of settings in response to receiving a second selection of the second setting from the client computer. In response to receiving, from the selected requesting computer, a second authorization request message that is transmitted on behalf of a request to access a resource, the request being associated with a user identifier that is assigned by the resource computer, the server computer may process the second authorization request message in accordance with the set of rules, which may comprise processing the authorization request message in accordance with the second protocol in response to determining that the transaction is performed using the user identifier that is assigned by the resource computer. In such embodiments, prior to receiving the second selection of the second setting from the client computer, the method may further comprise receiving, from the client computer, one or more identification numbers that are associated with the resource computer and storing the one or more identification numbers within the database. In such embodiments, determining that the user identifier is assigned by the resource computer may comprise determining that the user identifier comprises one of the one or more identification numbers. In such embodiments, processing the second authorization request message in accordance with the second protocol may comprise transmitting the authorization request message to the resource computer, receiving an authorization response message from the resource computer, and transmitting the authorization response message to the selected requesting computer, wherein the authorization response message indicates whether the request is authorized by the resource computer.

In some embodiments, the list of requesting computers may display, for at least one of the requesting computers, at least one of an identifier of a venue associated with the requesting computer and a name of the venue associated with the requesting computer.

In some embodiments, the method may further comprise receiving, from the client computer, one or more identification numbers. The server computer may store the one or more identification numbers within the database. In response to receiving, from the selected requesting computer, a another authorization request message that is transmitted on behalf of a request to access a resource, the request being associated with a user identifier that comprises one of the one or more identification numbers, the server computer may process the other authorization request message in accordance with the first protocol in response to determining that the user identifier comprises one of the one or more identification numbers.

In some embodiments, the method may further comprise receiving, from the client computer, one or more user identifiers. The server computer may store the one or more user identifiers within the database. In response to receiving, from the selected requesting computer, a another authorization request message that is transmitted on behalf of a request to access a resource, the request being associated with one of the one or more user identifiers, the server computer may process the other authorization request message in accordance with the first protocol in response to determining that the other request is associated with one of the one or more user identifiers.

These and other embodiments of the invention are described in detail below.

DEFINITIONS

Figure 1:
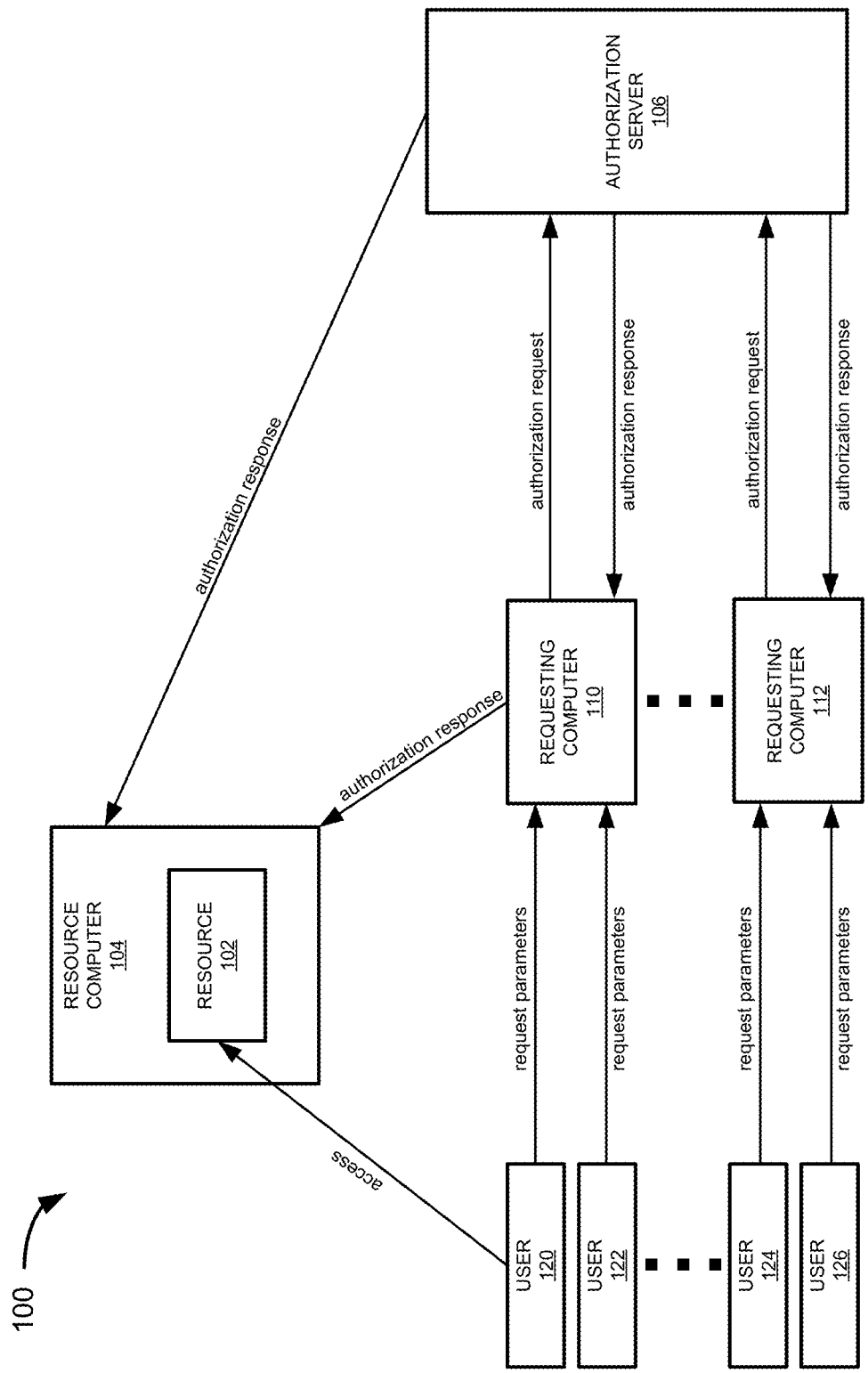
FIG. 1 illustrates a high-level block diagram of a user requesting access to a resource according to an embodiment of the invention.

Prior to discussing embodiments of the invention, a further description of some terms may be helpful in understanding embodiments of the invention.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "processor" may include hardware within a server computer (or other computing device) that carries out instructions embodied as code in a computer-readable medium. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

An "authorization request message" may include an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a consumer payment device or payment account. An authorization request message may also comprise additional data elements corresponding to identification information including, by way of example only: a service code, a CVV/iCW (card verification value), a dCVV (dynamic card verification value), a cryptogram (e.g., a unique cryptographic value for the transaction), an expiration date, etc. An authorization request message may also comprise transaction information, such as any information associated with a current transaction, such as the transaction amount, merchant identifier (e.g., MVV), merchant location, merchant category code, etc., as well as any other information that may be utilized in determining whether to authorize a transaction.

An "authorization response message" may include an electronic message reply to an authorization request message generated by an issuing financial institution or a payment processing network. An authorization response message according to some embodiments may comply with ISO 8583. An authorization response message may include, by way of example only, one or more of the following status indicators: Approval—transaction was approved; Decline—transaction was not approved; or Call Center—response pending more information, merchant must call the toll-free authorization phone number. The authorization may also include "identification information" as described above. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As described below, in some embodiments, a payment processing network may generate or forward the authorization response message to a gateway, merchant, or an acquirer of the merchant.

A "settlement message" can include an electronic message used to initiate the transfer of funds from an issuer to an acquirer, the funds being associated with an electronic payment transaction conducted at a merchant having a relationship with the acquirer. A settlement message according to some embodiments may comply with ISO 8583. Settlement can be initiated by a merchant, acquirer, gateway, or other suitable payment processing entity. Settlement messages can be generated and transmitted to a payment processing network and/or issuer periodically (e.g., daily) or sporadically. In some embodiments, a payment processing network can facilitate the transmission of a settlement message and an exchange of funds. For instance, upon receipt of a settlement message, a payment processing network can transmit the settlement message to an issuer. Funds can be transferred from the issuer to a settlement account designated by the payment processing network which can direct the funds from the settlement account to the acquirer which may deposit the funds (minus any fees owed to the acquirer) in a merchant account.

A "rule" can include one or more criteria applied to electronic payment transactions. A rule can be provided by an acquirer and can be customizable. In some embodiments, a rule can be a "default rule" determined by a gateway (as described in further detail below) or other transaction processing entity. Rules can apply to transactions conducted with specific merchant and/or categories of merchants.

DETAILED DESCRIPTION

Resources may be secured to prevent unauthorized users from accessing them. A prospective user of the resource may request access to the resource by providing authorization information in an authorization request. For example, user may present a key or enter a passcode in order to access a locked building, enter a password to access a secured a computer account or file, or enter a personal identification number to make a transaction on a payment account. However, some authorization requests may include valid authorization information while actually being fraudulent. For example, a user that is not authorized by an owner of the resource to use the resource may present authorization information of an authorized user in order to gain access to the resource. To prevent fraudulent access to the resource, an authorization server may consider certain parameters of the authorization request to see if they match known instances of fraudulent activity.

Filter rules may be established at an authorization server for determining whether a given authentication request would be deemed valid. One or more transport computers may rely on the filter rules to prevent fraudulent transactions that target the one or more transport computers. However, because different transport computers may encounter different types of fraud, administrators of the transport computers may need an intuitive and flexible way to customize filter rules at the authorization server. Thus, embodiments of the invention are directed to techniques for enabling an administrator of a transport computer to customize filtering rules via a user interface. For example, the administrator may interact with the user interface to create a rule that declines requests to access resource, where the requests are associated with a particular user identifier. The user interface can provide administrators of various transport computers the ability to customize filtering rules based on the type of fraudulent activity encountered by the transport computer.

I. Authorization System

An exemplary system 100 for requesting access to a resource can be seen in FIG. 1. The system 100 includes users 120-126, requesting computers 110-112, authorization server 106, resource computer 104, and resource 102.

FIG. 1 shows the users 120-126 requesting access to the resource 102, according to an embodiment of the invention. The resource 102 may be a physical building, a computer account or file, or a payment account. For example, the user 120 may access the resource directly or by using a user device (e.g., a mobile device or a computer). Access to the resource may be granted or denied by the resource computer 104. The resource computer 104 may comprise the resource 102 or the resource 102 may be separate from the resource computer 104. For example, where the resource 102 is access to a building, the resource computer 104 may be integrated into the building or a door of the building and the resource computer 104 may grant the users 120-126 access to the resource 102 by unlocking the door. In another example, the resource 102 is a computer account or file, the resource computer 104 comprises the computer account or file (i.e., the resource), and the resource computer 104 may grant access to the user 120.

The resource computer 104 may to grant access to the users 120-126 based on a determination of an authorization server 106. The users 120-122 may request access to the resource 102 by providing authorization information to the requesting computer 110. The users 124-126 may request access to the resource 102 by providing authorization information to the requesting computer 112.

Users 120-126 may each send a plurality of parameters for the authorization request, the parameters including the authorization information, to one of the requesting computers 110-112, the parameters being transmitted over a network (e.g., the Internet). For a particular user (e.g., user 120), the parameters may include the authorization information, a credential of the user or a user identifier that was assigned to the user by the resource computer, a time of day of the request, a date of the request, an identifier of the user, the resource being requested (e.g., resource 102), and a resource computer (e.g., resource computer 104), or a geo-location of one of the user, the resource, and the resource computer.

The requesting computer 110 may receive the request parameters from the user 120 and generate an authorization request based on the received request parameters. The requesting computer 110 may send the authorization requests to the authorization server 106. In some embodiments, the requesting computer may be associated with a venue that has a physical location. The requesting computer 110 may be coupled to the authorization server 106 or it may be connected to the authorization server via a network (e.g., the Internet). The authorization server 106 may also be coupled to the resource computer 104 or it may be connected to the resource computer 104 via a network.

As further described below, the authorization server 106 may comprise one or more rules that can be used to determine whether an authorization request is valid or not. Each of the one or more rules can have a plurality of conditions that may be compared to the parameters of an authorization request. The authorization server may determine that an authorization request should be rejected (e.g., the user 120 is denied access to the resource 102) if the parameters of the authorization request satisfy one or more conditions of one or more of the rules. The authorization server 106 can send an authorization response to a requesting computer including an outcome indication which indicates whether the authorization request was rejected or accepted. The authorization response may also indicate that the requesting computer should review the authorization request (e.g., request additional information from the user). The authorization server 106 may also send the authorization response to the resource computer 104.

The requesting computer that receives the authorization response from authorization server 106 can forward the authorization response to the resource computer 104. Requesting computers 110-112 may be coupled to the resource computer or it may be connected to the authorization server 106 via a network. The resource computer may grant or deny access to the resource 102 based on the authorization response. For example, the resource computer may unlock the door of the building, or it may grant permissions to a computer account or file, or it may authorize a transaction against a payment account.

The one or more rules used by the authorization server 106 may reject authorization requests that are fraudulent. However, the effectiveness of the rules in preventing fraud stems from how well the rules are configured. Thus, an administrator of the rules, who may be associated with (e.g., employed by) an owner of resource 102 may interact with some interface (e.g., a management portal) provided by the authorization server 106 to configure the rules. This interface may be integrated into the authorization server 106, or it may be a separate device that is coupled to the authorization server 106 or connected to the authorization server 106 via a network. The interface may enable the administrator to view and manage the one or more rules, as further described below.

II. Transaction Processing System

Embodiments of the invention are directed to techniques for preventing consumer fraud and merchant fraud by enabling acquirers to customize filtering rules via an acquirer-facing user interface. Merchants (e.g., online merchants) can engage in transactions with consumers using electronic payment methods (e.g., credit card accounts, debit accounts, prepaid accounts, and the like). To facilitate the exchange of authorization messages with issuers and the movement of funds from issuers, a merchant can utilize an acquirer (e.g., an acquiring bank).

Merchant fraud has become increasingly prevalent in the context of electronic payment transactions (e.g., transactions involving credit, debit, prepaid, or other electronic payment accounts). Such fraud may involve a merchant (e.g., an entity that sells goods and/or services) initiating fraudulent transactions using unauthorized payment accounts, selling illegal goods or services, establishing a sham storefront cross-linked with another merchant selling illegal goods or services, laundering money, etc. Merchant fraud can be problematic to acquirers since fraudulent transactions may result in an acquirer being assessed a fine and/or being liable for all or part of the fraudulent transaction amount.

Although existing fraud detection systems exist, such systems are focused on consumer fraud and are generally ineffective in deterring merchant fraud. Additionally, because each acquirer may deal with different types of consumers, merchants, and fraudulent schemes, merely providing a system that deters merchant fraud in a generalized fashion may not be enough. In the case of consumer fraud or merchant fraud, an acquirer may be subject to fines or financial responsibility for all or a portion of the fraudulent transaction amount. Thus, it may be in the acquirer's interest to reduce the number of risk-associated transactions without interfering with the flow of trusted transactions.

To meet this objective, an acquirer could formulate a transaction filtering ruleset for application to requests received from merchants, where the ruleset is configured to allow trusted transactions and block risky transactions. However, due to differing circumstances amongst acquirers (e.g., differing merchant base, differing customer base), what constitutes a "risky" transaction versus a "trusted" transaction may vary significantly from acquirer to acquirer. Thus, to enable acquirers to develop rulesets independently from one another, some embodiments may provide a transaction gateway positioned (in a communicative sense) between merchants and issuers that includes an interface for customizing rulesets. In some embodiments, the interface may be a web-based interface that is provided by a management portal.

The management portal allows acquirers to develop rules that vary in breadth and criteria. Through the management portal, acquirers may develop rules that apply to all requests originating from all merchants of the acquirer (i.e., acquirer-wide rules) and rules that apply only to requests that originate from a specific merchant (i.e., merchant-specific rules). Additionally, acquirers can configure rules to filter requests based on a variety of criteria including a request's electronic commerce indicator (ECI) value, the type of application programming interface (API) service requested, and the payment account associated with the request.

As an illustration, an acquirer can establish a relationship with a merchant that specializes in a particular type of good. If the acquirer detects a disproportionate number of fraudulent requests originating from the merchant, an employee of the acquirer (i.e., an administrator) may use the management portal to develop a ruleset specific to the merchant that blocks transactions that share similar characteristics with past fraudulent transactions. For instance, if fraudulent transactions originating at the merchant tend to be performed using an international debit card and tend to have an ECI value of one, the administrator may access a webpage of the portal for managing rules that are specific to the merchant. Through one or more interactions with the webpage, the administrator can establish a rule that blocks requests that (1) originate from the merchant, (2) involve an international debit card, and (3) have an ECI value of one.

Embodiments of the invention may provide a number of advantages. Merchant fraud in the context of electronic payment transactions has become more common. When a merchant initiates a fraudulent transaction involving an unauthorized payment account (e.g., a stolen credit card number), a sham storefront, illegal goods, money laundering, etc., the merchant's acquirer may be subject to fines and/or liability for the amount of the fraudulent transaction. However, existing fraud detection techniques are focused on consumer fraud and generally ineffective in detecting merchant fraud. By providing an acquirer-facing rule management portal that enables acquirers to establish merchant-specific rulesets that block questionable transactions originating from a suspicious merchant, some embodiments may reduce the incidence of merchant fraud thereby minimizing an acquirer's financial risk.

Additionally, by providing rules that can vary in breadth and criteria, some embodiments may enable acquirers to customize their rulesets at a finer granularity. This additional granularity may provide rulesets that more thorough in blocking risky transactions while allowing trusted transactions through, thereby reducing fraud overall. Furthermore, because each acquirer may encounter different types of fraud, the additional granularity may also enable more acquirers to generate effective rulesets at the gateway.

Definitions that may assist in understanding the following disclosure in reference to FIGS. 2-15 are now provided. A merchant ID (MID) may be an identifier that is assigned to a single entity, such as a merchant. MIDs may be used by a transaction gateway to identify merchants. In particular, the MID may be managed within a portfolio. A portfolio may comprise one or more MIDs that a customer (e.g., an acquirer) has management control over. A processor may store and manage MIDs from multiple portfolios on behalf of multiple clients. It should be noted that a merchant that is managed at multiple processors may have a different MID for each of the processors. A reseller may be an entity that boards merchants on a selected processor or multiple processors. In some cases, a reseller may hold a portfolio of merchants. It should be noted that embodiments of the present invention may provide advantages for servicing engagements with processors, acquirers, and resellers.

Figure 2:
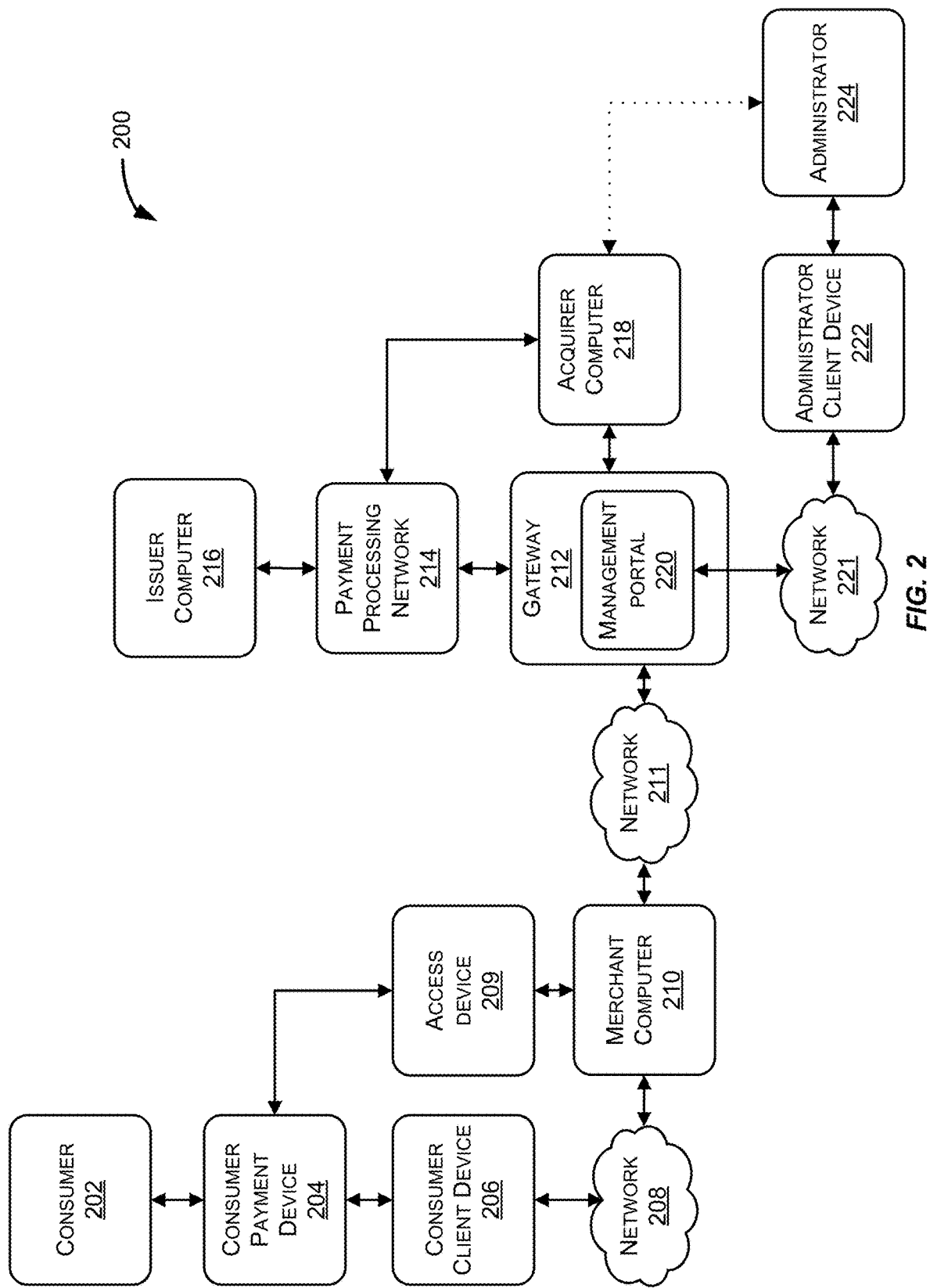
FIG. 2 illustrates a block diagram of an exemplary payment processing system in accordance with some embodiments.

FIG. 2 illustrates a block diagram of an exemplary payment processing system 200 in accordance with some embodiments. Although some of the entities and components in the system 200 are depicted as separate, in some instances, one or more of the components may be combined into a single device or location. Similarly, although certain functionality may be described as being performed by a single entity or component within the system 200, the functionality may in some instances be performed by multiple components and/or entities. Communication between entities and components may comprise the exchange of data or information using electronic messages and any suitable electronic communication medium and method, as described below.

As illustrated in FIG. 2, the system 200 may include one or more consumers, consumer payment devices, consumer client devices, networks, access devices, merchant computers, gateways, acquirer computers, payment processing networks, issuer computers, management portals, administrators, administrator client devices, and/or any other suitable payment processing entities. For instance, as illustrated in FIG. 2, the system 200 can include a consumer 202 having a consumer payment device 204. The consumer 202 can be an individual, an organization such as a business, or any other suitable entity capable of purchasing goods and/or services using the consumer payment device 204.

The consumer payment device 204 can be in any suitable form. For instance, a suitable payment device can be handheld and compact so that it can fit into a wallet and/or pocket (e.g., pocket-sized) of the consumer 202. Exemplary consumer payment devices may include, but are not limited to, smart cards, magnetic stripe cards, keychain devices (such as the Speedpass™ commercially available from Exxon-Mobil Corp.), smart media, transponders, 2-D barcodes, QR codes, and the like. If the consumer payment device 204 is in the form of a smartcard or other payment card (e.g., a debit card, credit card, prepaid card, gift card, and the like), the consumer payment device 204 may operate in a contact mode (e.g., using data stored on a magnetic stripe) and/or a contactless mode (e.g., using contactless circuitry and wireless communication such as NFC, Bluetooth, and the like).

The system 200 can further include a consumer client device 206 that may include an external communication interface (e.g., for communicating with a merchant computer 210 or other entity), system memory comprising one or more modules to generate and utilize electronic messages, and a data processor for facilitating a financial transaction conducted with a merchant operating the merchant computer 210. The consumer client device 206 can be any suitable computing device, including a stationary device (e.g., a desktop computer) or a mobile device such as a laptop computer, tablet computer, net book, mobile phone (e.g., a smartphone), and the like.

In some embodiments, the system 200 can further include the merchant computer 210 which may be operated by a merchant. As used herein, a "merchant" may refer to an entity that engages in transactions and that can sell goods and/or services to consumers. The merchant computer 210 can include an external communication interface (e.g., for communicating with the consumer client device 206, a gateway 212, or other entity), system memory comprising one or more modules to generate and utilize electronic messages, and a data processor for facilitating financial transactions and the exchange of electronic messages.

To conduct a purchase transaction, in some embodiments, the consumer 202 can use the consumer client device 206 to communicate with the merchant computer 210. Such a transaction may involve the consumer 202 using the consumer client device 206 to provide account information associated with the consumer payment device 204 to the merchant computer 210. For instance, the merchant computer 210 may host a merchant website that provides an interface for the consumer 202 to select goods and/or services for purchase and enter account information to pay for the purchase such as an account number, expiration date, CVV, and the like.

In some embodiments, the consumer client device 206 and the merchant computer 210 can communicate using a network 208 which may be any suitable communication network such as the Internet, a voice network, and/or a data network. Any suitable communication protocol can be used including, but not limited to, WiFi (IEEE 802.11 family standards), 3G, 4G EDGE, and the like.

The system 200 may further include an acquirer computer 218 operated by an acquirer. As used herein, an "acquirer" may refer to a business entity (e.g., a commercial bank or financial institution) that has a business relationship with a particular merchant or similar entity, and that facilitates clearing, settlement, and any other suitable aspect of electronic payment transactions. The acquirer computer 218 (which may be referred to as a transport computer) may include an external communication interface (e.g., for communicating with the merchant computer 210, the gateway 212, a payment processing network 214, or other entity), system memory comprising one or more modules to generate and utilize electronic messages, and a data processor for facilitating financial transactions and the exchange of electronic messages. It should be noted that while only a single acquirer computer is depicted in FIG. 2, system 200 may include a plurality of acquirers, which each have formed business relationships with one or more merchants or other entities.

The system 200 may further include an issuer computer 216 operated by an issuer. As used herein, an "issuer" may refer to a business entity (e.g., a bank or other financial institution) that maintains financial accounts for consumers and that may issue payment accounts and consumer payment devices (e.g., credit cards, debit cards, and the like) used to access funds of such accounts. Some entities may perform both issuer and acquirer functions. The issuer computer 216 may include an external communication interface (e.g., for communicating with the payment processing network 214 or other entity), system memory comprising one or more modules to generate and utilize electronic messages, and a data processor for facilitating financial transactions and the exchange of electronic messages.

The system 200 may further include the payment processing network 214, which may include data processing subsystems, networks, and operations used to support and deliver authorization services, exception file services, and clearing and settlement services. For instance, the payment processing network 214 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 214 may include an external communication interface (e.g., for communicating with the gateway 212, the acquirer computer 218, the issuer computer 216, or other entity), system memory comprising one or more modules to generate and utilize electronic messages, and a data processor for facilitating financial transactions and the exchange of electronic messages.

As shown in FIG. 2, the system 200 can further include the gateway 212. As used herein, a "gateway" can be any entity that provides services in support of electronic payment transactions. In some embodiments, as described in further detail below, such services can include detecting consumer fraud and merchant fraud using rules provided by acquirers. The gateway 212 may include an external communication interface (e.g., for communicating with one or more merchant computers including the merchant computer 210, one or more acquirers including the acquirer computer 218, the payment processing network 214, the issuer computer 216, or other entity), system memory comprising one or more modules to generate and utilize electronic messages, and a data processor for facilitating financial transactions and the exchange of electronic messages. The components of the gateway 212, according to some embodiments, are described in further detail below with reference to FIG. 3.

In some embodiments, the gateway 212 and the merchant computer 210 can communicate using a network 211 which may be any suitable communication network such as the Internet, a voice network, and/or a data network.

In some embodiments, the gateway 212 may provide additional services such as a hosted order page and/or silent order post. As used herein, a "hosted order page" (HOP) can be a third-party hosted webpage that accepts payment information from consumers (e.g., the consumer 202) on behalf of merchants (e.g., the merchant computer 210). In some embodiments, the merchant's website may redirect a consumer to a HOP on a domain/server of the gateway 212 when the consumer selects a 'Buy' or 'Checkout' button from an online shopping cart. Once at the HOP, the consumer can input payment information (e.g., information associated with the consumer payment device 204), such as credit card information. The gateway 212 can use the payment information entered by the consumer to process the payment transaction for the merchant so that the merchant can avoid handling the consumer's payment information, and thereby avoid the cost and effort of complying with the Payment Card Industry Data Security Standard (PCI DSS) and government regulations regarding storing sensitive payment information. As used herein, a "silent order post" (SOP) may be akin to a HOP but with only the sensitive textboxes and other input controls being hosted by the gateway 212. That is, the merchant can host the order page but the sensitive fields, such as the credit card number and expiration date entry textboxes, can be posted only at the gateway 212.

In some embodiments, the gateway 212 may provide a management portal 220 that provides a user interface with which acquirers may interact with to configure rules. As shown in FIG. 2, the management portal 220 may be integrated into the gateway 212. Alternatively, the management portal 220 may be a separate device. For example, the management portal 220 may correspond to a server computer that is connected to the gateway 212. In some embodiments, the management portal 220 may be connected to the gateway 212 from across the Internet. In such embodiments, the management portal 220 may include an external communication interface (e.g., for communicating with the gateway 212, an administrator client device 222, or other entity), system memory comprising one or more modules to generate and utilize electronic messages, and a data processor for facilitating financial transactions and the exchange of electronic messages. The components of the management portal 220, according to some embodiments, are described in further detail below with reference to FIG. 3.

In some embodiments, the administrator client device 222 and the gateway 212 can communicate using a network 221 which may be any suitable communication network such as the Internet, a voice network, and/or a data network.

The system may further include the administrator client device 222, which may be associated with the acquirer and operated by an administrator 224. The administrator client device 222 may include an external communication interface (e.g., for communicating with the gateway 212, the management portal 220, or other entity), system memory comprising one or more modules to generate and utilize electronic messages, and a data processor for facilitating rules configuration conducted with the management portal 220. The administrator client device 222 can be any suitable computing device, including a stationary device (e.g., a desktop computer) or a mobile device such as a laptop computer, tablet computer, net book, mobile phone (e.g., a smartphone), and the like.

The system may further include the administrator 224, who has access to the administrator client device 222. The administrator 224 can be an individual, an organization such as a business, or any other suitable entity capable of configuration rules contained in gateway 212 using the administrator client device 222. For instance, the administrator 224 may use administrator client device 222 to access management portal 220 from across network 221. The administrator 224 may input a series of selections via the user interface provided by management portal 220, and the management portal 220 may propagate configurations to the gateway 212 in accordance with the selections. The steps in which the selections are received and the configurations are propagated, according to some embodiments, are described in further detail below with reference to FIGS. 4-13.

Many of the data processing functions and features of some embodiments of the invention may be present in the gateway 212 and the management portal 220 (and one or more server computers therein). It should be understood, however, that such functions and features could be present in other components of the system 200 in some embodiments, and need not be present in the gateway 212, the management portal 220, or one or more server computer therein.

The consumer client device 206, access device 209, merchant computer 210, gateway 212, management portal 220, acquirer computer 218, payment processing network 214, issuer computer 216, and administrator client device 222 may all be in operative communication with each other. For instance, as described above, some or all of these components of the system 200 can include an external communication interface. As used herein, an "external communication interface" may refer to any hardware and/or software that enables data to be transferred between two or more components of the system 200 (e.g., between devices residing at locations such as an issuer, acquirer, merchant, or payment processing network, etc.). Some examples of external communication interfaces may include a modem, a network interface (such as an Ethernet card), a communications port, a Personal Computer Memory Card International Association (PCMCIA) slot and card, and the like. Data transferred via an external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components of the system 100 may be used. Some examples of such methods may include utilizing predefined and static fields (such as in core TCP/IP protocols); "Field: Value" pairs (e.g., HTTP, FTP, SMTP, POP3, and SIP); an XML based format; and/or Tag-Length-Value format.

As described above, the system 200 can facilitate an electronic commerce (e-commerce) transaction where, for instance, the consumer 202 purchases goods and/or services using a merchant website hosted by the merchant computer 210 (i.e., a requesting computer) and accessible via the network 208 using the consumer client device 206. In some other embodiments, the system 200 can also facilitate a "card present" transaction where the consumer 202 makes a purchase in-person at a merchant location (e.g., a store, restaurant, hotel, or any other suitable retail establishment). In such embodiments, the merchant computer 210 can include (or is coupled to) a merchant access device 209. Exemplary merchant access devices may include point of sale (POS) devices (stationary and mobile), mobile phones (e.g., smartphones), PDAs, desktop computers, laptop computers, tablet computers, handheld specialized readers, set-top boxes, electronic cash registers (ECRs), automated teller machines (ATMs), kiosks, and the like. A merchant access device can use any suitable contact or contactless mode of operation to send or receive date from, or associated with, consumer payment devices (e.g., the consumer payment device 204). In some embodiments, a merchant access device may include a reader including one or more of radio frequency (RF) antennas, optical scanners, bar code readers, QR code readers, and magnetic stripe readers to interact with a consumer payment device such as the consumer payment device 204.

In some embodiments, the consumer payment device 204 can be a mobile device such as a mobile phone (e.g., smart phone), tablet computer, PDA, net book, laptop computer, media player, or the like. A mobile device may facilitate an "electronic" or "digital wallet" that may be used to conduct an electronic payment transaction. In such embodiments, an electronic wallet server (not shown) may be in operational communication with the merchant computer 210, gateway 212, payment processing network 214, and/or other entity, and may maintain an association between the consumer's digital wallet and one or more payment accounts (e.g., credit, debit, prepaid accounts, and the like). An electronic wallet server can provide a web interface (e.g. through one or more web pages) to receive and transmit requests for payment services and/or may provide an API on the consumer payment device 204 to provide the web service. A digital wallet can be utilized in both e-commerce and card present transaction environments.

A description of a typical electronic transaction flow using the system 200 may be helpful in understanding embodiments of the invention. As an initial step, the consumer 202 can attempt to purchase goods and/or services from a merchant. In the context of an e-commerce transaction, this may involve the consumer 202 selecting the items to purchase from a website hosted by the merchant computer 210 accessible via the network 208 using the consumer client device 206. The consumer can enter payment information (e.g., an account number, expiration date, CVV, etc.) on the merchant website or, in some embodiments, a HOP or SOP hosted by the gateway 212. In some embodiments, the payment information can already be stored in a database (e.g., a "cards-on-file database) accessible to the merchant computer 210 (or gateway 212).

The merchant computer 210 can then generate an authorization request message for the transaction, and can transmit this message to the gateway 212. The gateway 212 can then transmit the authorization request message to the payment processing network 214 which may forward the message to the issuer computer 216 operated by the issuer of the account associated with the consumer payment device 204.

Upon receipt of the authorization request message, the issuer computer 216 can perform a number of processes (e.g., verifying the account, confirming that the account has a sufficient balance or available credit to cover the amount of the transaction, consumer fraud detection, and/or other processes) to determine whether to authorize the transaction. An authorization response message is then generated by the issuer computer 216 including an indication of the authorization decision, and transmitted by the issuer computer 216 to the gateway 212 via the payment processing network 214. The gateway 212 stores a record of the authorization decision and then forwards the authorization response message to the merchant computer 210. The merchant computer 210 may then provide an indication to the consumer 202 whether authorization of the transaction has been approved or declined by the issuer. In some embodiments, this may involve displaying an indication of the authorization decision on the consumer client device 206 connected to the merchant's website via the network 208.

At the end of the day, if the transaction was authorized by the issuer, a clearing and settlement process can be conducted by the gateway 212. A clearing process may include the exchange of financial details between the acquirer computer 218 and the issuer computer 216 across the payment processing network 214 to facilitate posting to the consumer's account and reconciliation of the settlement position. A settlement process may include the actual transfer of funds from the issuer computer 216 to the acquirer computer 218. In some embodiments, to initiate settlement, the gateway can transmit a settlement file including the an approval code for the transaction (along with other approved transactions in a batch format) to the payment processing network 214 which can then communicate with the issuer computer 216 and the acquirer computer 218 to facilitate the transfer of funds.

III. Gateway and Management Portal

Figure 3:
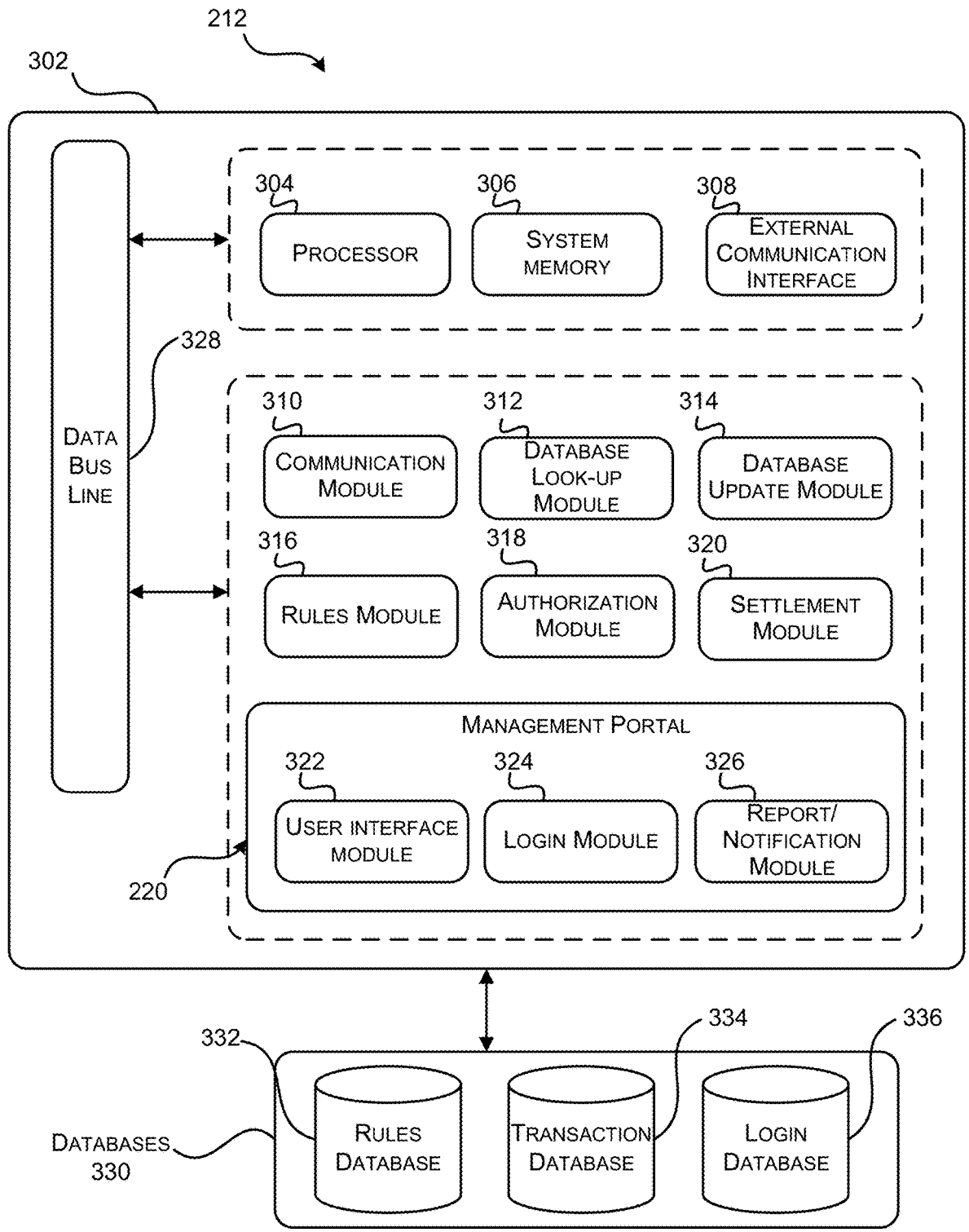
FIG. 3 illustrates a block diagram of an exemplary gateway including a server computer in accordance with some embodiments.

FIG. 3 illustrates a block diagram of the gateway 212 including an exemplary server computer 302 in accordance with some embodiments. The server computer 302 is illustrated as comprising a plurality of hardware and software modules (304-328). However, it should be appreciated that this is provided for illustration purposes only, and each of the modules and associated functionality may be provided and/or performed by the same or different components. That is, the server computer 302 may, for instance, perform some of the relevant functions and steps described herein with reference to the gateway 212 through the use of any suitable combination of software instructions and/or hardware configurations. It should be noted that although FIG. 3 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s).

The server computer 302 is shown as comprising a processor 304, system memory 306 (which may comprise any combination of volatile and/or non-volatile memory such as, for example, buffer memory, RAM, DRAM, ROM, flash, or any other suitable memory device), and an external communication interface 308. Moreover, one or more of the modules 310-326 may be disposed within one or more of the components of the system memory 306, or may be disposed externally. As was noted above, the software and hardware modules shown in FIG. 3 are provided for illustration purposes only, and the configurations are not intended to be limiting. The processor 304, system memory 306 and/or external communication interface 308 may be used in conjunction with any of the modules described below to provide a desired functionality. Some exemplary modules and related functionality may be as follows:

A communication module 310 may be configured or programmed to perform some or all of the functionality associated with receiving, sending, and generating electronic messages for transmission through the system 200 to or from any of the entities shown in FIG. 2. When an electronic message is received by the server computer 302 via the external communication interface 308, it may be passed to the communication module 310. The communication module 310 may identify and parse the relevant data based on a particular messaging protocol used in the system 200. The received information may comprise, for instance, identification information, transaction information, and/or any other information that the gateway 212 may utilize in processing an electronic payment transaction. The communication module 310 may then transmit any received information to an appropriate module within the server computer 302 (e.g., via a data bus line 328). The communication module 310 may also receive information from one or more of the modules in the server computer 302 and generate an electronic message in an appropriate data format in conformance with a transmission protocol used in the system 200 so that the message may be sent to one or more components within the system 200 (e.g., to the payment processing network 214, merchant computer 210, or other entity). The electronic message may then be passed to the external communication interface 308 for transmission. The electronic message may, for example, comprise an authorization request message (e.g., to be transmitted to the issuer computer 216 via the payment processing network 214), an authorization response message (e.g., to be transmitted to the merchant computer 210), a settlement message (e.g., to be transmitted to the payment processing network 214), or any other suitable electronic message used in the context of an electronic payment transaction.

A database look-up module 312 may be programmed or configured to perform some or all of the functionality associated with retrieving information from one or more databases 330. In this regard, the database look-up module 312 may receive requests from one or more of the modules of the server computer 302 for information that may be stored in one or more of the databases 330. The database look-up module 312 may then determine and query an appropriate database.

A database update module 314 may be programmed or configured to provide some or all of the functionality associate with maintaining and updating the databases 330, such as a rules database 332, a transaction database 334, and login database 336. In this regard, the database update module 314 may receive information such as rules (e.g., from acquirers), transaction information (e.g., authorization request and response messages), login information (e.g., administrator usernames and passwords) and other information from one or more of the modules described herein. Such information may then be stored in the appropriate location in the databases 330 using any suitable storage process.

A rules module 316 may be programmed or configured to perform some or all of the functionality associated with applying acquirer-provided rules to merchant transactions. In some embodiments, the rules module 316 can apply default rules created by the gateway 212 or other component of the system 200. In some embodiments, the rules module 316 may apply a rule to a plurality (e.g., an aggregation) of transactions and, in some embodiments, the rules module 316 may apply a rule to individual transactions. The rules module 316 may retrieve a rule from the rules database 332 using the database look-up module 312. Application of a rule may be triggered by receipt of an authorization request message, an authorization response message, a clearing message, a settlement message, a scheduled time, expiration of a predetermine period of time, or any other suitable triggering event according to various embodiments of the invention.

An authorization module 318 may be configured or programmed to perform some or all the functionality associated with processing and generating authorization messages. For instance, the authorization module 318 may receive authorization response messages for merchant transactions from the merchant computer 210 and may forward such messages to the issuer computer 216 via the payment processing network 214. The authorization module 318 may also receive authorization response messages for merchant transactions from the issuer computer 216 via the payment processing network, and may forward such messages to the merchant computer 210. In some embodiments, as described in further detail below, the authorization module 318 may generate an authorization response message (e.g., a decline) and transmit the message to the merchant computer 210. The communication module 310 and external communication interface 308 may be utilized by the authorization module 318 to send and receive authorization messages. The authorization module 318 may store authorization messages (or a record of authorization messages) and other transaction information in the transaction database 334 (e.g., using the database update module 314).

A settlement module 320 may be programmed or configured to perform some or all the functionality associated with processing, generating, and transmitting settlement messages. For instance, the settlement module 320 may generate a settlement message for a merchant's transactions (e.g., for the merchant operating the merchant computer 210), and may transmit the message to the payment processing network 214 so that it can be forwarded to the issuers associated with the merchant's transactions (e.g., to the issuer computer 216 and to devices operated by other issuers of accounts used to conduct transactions at the merchant). In some embodiments, the settlement module 320 can generate and transmit settlement messages periodically (e.g., daily) in a batch format such that a plurality of the merchant's transaction are settled. In some embodiments, the settlement module 320 may retrieve information about approved transactions from the transaction database 334 (e.g., using the database look-up module 312) to determine which transactions to include in a settlement message. In some other embodiments, the settlement module 320 may receive the settlement message from a merchant (e.g., from the merchant computer 210) and may forward the message to the payment processing network 214. As described in further detail below, in some embodiments, the settlement module 320 can generate a settlement message for only a portion of a merchant's transactions such that settlement of the remaining portion of the merchant's transactions is delayed. The communication module 310 and external communication interface 308 may be utilized by the settlement module 320 to send and receive settlement messages.

As shown above in FIG. 2, the gateway 212 may include the management portal 220, provides a user interface for administrators to provide and configure rules for acquirers. FIG. 3 depicts management portal 220 as comprising a plurality of software modules (322-326). Once again, it should be appreciated that this is provided for illustration purposes only, and that management portal may comprise or be associated with the same or a different set of modules than what is shown. Furthermore, although FIG. 3 illustrates the management portal 220 as being incorporated into the server computer 302, the disclosure is not meant to be so limited. For instance, the management portal 220 may be implemented by a separate server computer that comprises a separate set of hardware and software modules.

A user interface module 322 may be programmed or configured to provide some or all of the functionality associated with providing a user interface for administrators to provide and configure sets of rules for their respective acquirers. In some embodiments, the user interface module may provide a web-based interface. The webpages included in the web-based interface, which, according to some embodiments, may comprises a plurality of web pages including a login page, webpages for displaying and receiving PANs and BINs meant to be filtered or flagged for later processing, and webpages for displaying and configuring sets of rules specific to merchants, are described in further detail below with reference to FIGS. 4-13. The user interface module 322 can use the communication module 310 to display information related to rules (e.g., settings) to the administrators and receive modifications for the rules from the administrators. The user interface module 322 may use the database look-up module 312 and the database update module 314 to retrieve the information from the rules database 332 for display and to persist received modifications in rules database 332 respectively. The user interface module 322 may receive reports and/or alerts from a report/notification module 326 and display each of the reports and/or alerts to the intended administrator.

A login module 324 may be programmed or configured to perform some or all the functionality associated with controlling access to the management portal 220. To ensure that no other individuals other than the administrator of an acquirer has access to view and modify the acquirer's ruleset, the management portal 220 may restrict access to the user interface module 322 through a scheme that is managed by the login module 324. In particular, an administrator for a particular acquirer may be given a set of credentials (e.g., a username and a password) and the login module 324 may use the database update module 314 to store the set of credentials within login database 336. When accessing the user interface module 322, the administrator may provide the set of credentials to the login module 324. To validate the set of credentials, the login module 324 may use the database look-up module 312 to retrieve the set of credentials from the login database 336 (e.g., for comparison). Once the set of credentials are validated, the administrator is given access to the user interface module 322. For example, when accessing the web interface provided by the user interface module 322 with the administrator client device 222, the administrator 224 may be presented with a login webpage that asks for a username and a password that was previously assigned to or chosen by the administrator 224. Once the username and password are provided via the administrator client device 222, the login module 324 forwards the administrator client device 222 to a webpage of the web interface.

A report/notification module 326 may be programmed or configured to perform some or all of the functionality associated with generating and transmitting reports and notifications. As described in further detail below, reports and notifications can be transmitted to acquirers (e.g., the acquirer computer 218) or other transaction processing entity such as the merchant computer 210, payment processing network 214, etc. The communication module 310 and external communication interface 308 may be utilized by the report/notification module 326 to transmit reports and notifications. In some embodiments, the report/notification module 326 may transmit reports and/or alerts to the user interface module 322 which may provide an interface for an administrator of an acquirer or other entity to view the reports and/or alerts. For example, when a report or notification is generated by the report/notification module 326, the user interface module 322 may include the report or notification in a webpage that is displayed on the administrator client device 222.

The gateway 212 may include one or more databases 330, such as rules database 332, transaction database 334, and login database 336. Each of the databases shown in this example may comprise more than one database, and may be located in the same location or at different locations. The rules database 332 may contain information related to rules to be applied by the gateway 212 to merchant transactions. As described in further detail below, the rules stored in the rules database 332 may be provided by acquirers and may include any criteria suitable for detecting (or reducing the incidence of) merchant fraud. In some embodiments, the rules stored in the rules database 332 can be default rules created by the gateway (e.g., the rules module 316) or other entity of the system 100. For electronic transactions that pass through the gateway 212, transaction data can be stored in the transaction database 334, including information about authorization request messages, authorization response messages, issuer approvals/declines, returns, credits, and other information. The login database 336 may contain sets of credentials for administrators associated with one or more acquirers, where the sets of credentials are used in conjunction with the login module 324 to restrict access to the user interface module 322

In FIG. 3, the server computer 302 is illustrated as comprising part of the gateway 212. This, however, is not intended to be limiting. In some embodiments, one or more of the modules 304-326 and databases 332-336 comprise any other suitable entity of the system 200. For instance, in some embodiments, one or more functionalities associated with the gateway 212 described herein may be performed by the payment processing network 214, issuer computer 216, acquirer computer 218, or other suitable entity.

IV. Configuring Acquirer-Provided Rules

FIGS. 4, 7, 9, and 11 show flowcharts illustrating methods 400, 700, 900, and 1100 in accordance with some embodiments. The steps of methods 400, 700, 900, and 1100 may be performed by the server computer 302 of the gateway 212. In other embodiments, one or more of the steps may be performed by any another payment processing entity in the system 200. In some embodiments, one or more steps may be performed by entities not shown in FIG. 2, such as a merchant processor, acquirer processor, issuer processor, or other suitable entity. In particular, the following sections describe the management of rules that filter requests at the processor or acquirer level in reference to FIGS. 4 and 6-10 and at the portfolio level.

A. Configuring PAN Filtering

Figure 4:
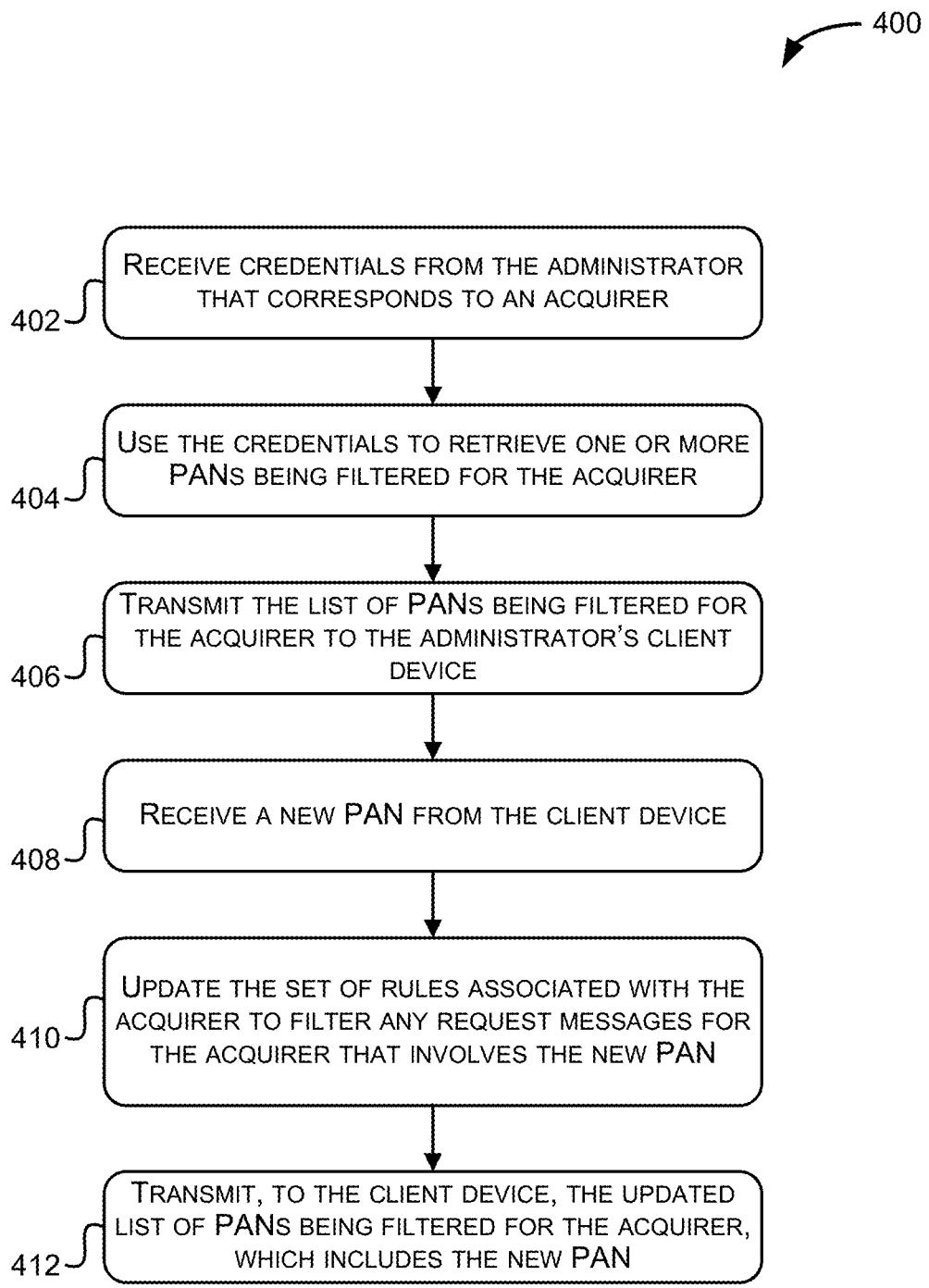
FIG. 4 shows a flowchart illustrating an exemplary method of managing the filtering of one or more primary account numbers (PANs) in accordance with some embodiments.

FIG. 4 shows a flowchart illustrating an exemplary method 400 of managing the filtering of one or more user identifiers that are issued by a resource computer in accordance with some embodiments. In some embodiments, the user identifiers may correspond to primary account numbers (PANs).

In FIG. 4, at step 402, a server computer receives a set of credentials from the client device used by an administrator associated with an acquirer. In some embodiments, in response to a business relationship being established between the acquirer and the gateway 212, where the gateway 212 is assigned to process authorization request messages from merchant computers (e.g., the merchant computer 210) on behalf of the acquirer, the acquirer may be assigned an acquirer ID and the administrator 224 may be assigned a username and a password. In particular, to access the web interface provided by the management portal 220, the administrator 224 may direct the administrator client device 222 to the Uniform Resource Locator (URL) of the web interface. The administrator client device 222 may be forwarded to a web page of the web interface where the administrator 224 provides a set of credentials.

Figure 5:
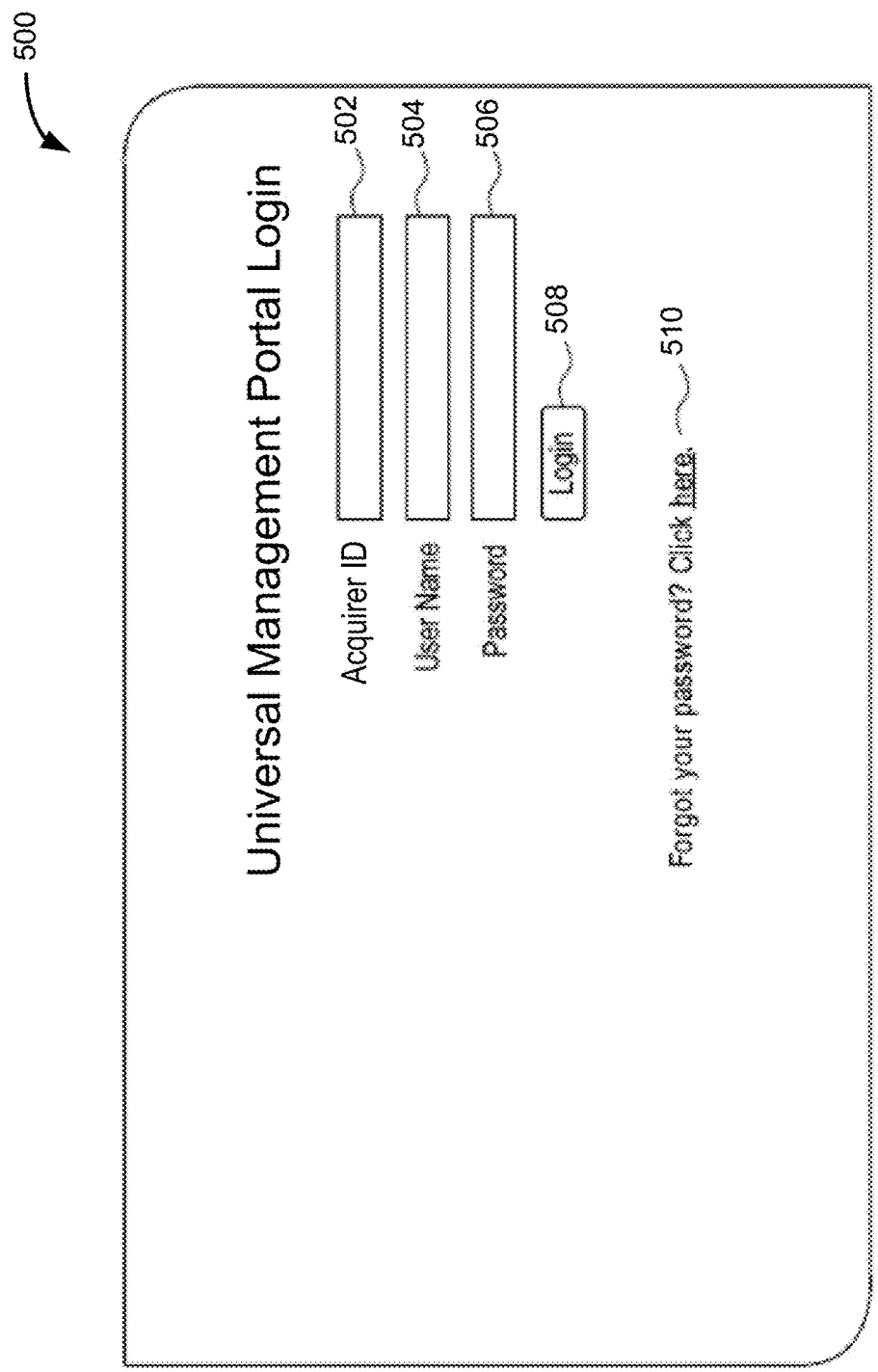
FIG. 5 shows a screenshot of an exemplary graphical user interface (GUI) for logging into a web interface of a management portal in accordance with some embodiments.

FIG. 5 shows a screenshot of an exemplary graphical user interface (GUI) 500 for logging into a web interface of a management portal in accordance with some embodiments. In the shown interface, an administrator of an acquirer may enter a set of credentials that correspond to the administrator and the acquirer in a provided set of forms to obtain access to the web interface. For example, the administrator may enter the acquirer's ID into the field 502, the administrator's username into the field 504, and the administrator's password, PIN, or other secret identifier into the field 506. The acquirer's ID may be unique amongst all acquirers for which the gateway 212 is processing authorization request messages and may be a chosen name of the acquirer. In some embodiments, the username may be unique amongst all administrators of a particular acquirer. The administrator may initiate a login by selecting the button 508, so that the administrator client device 222 establishes a secure trusted connection with the management portal 220. If the administrator has forgotten his or her password, the administrator may click the link 510.

Figure 6:
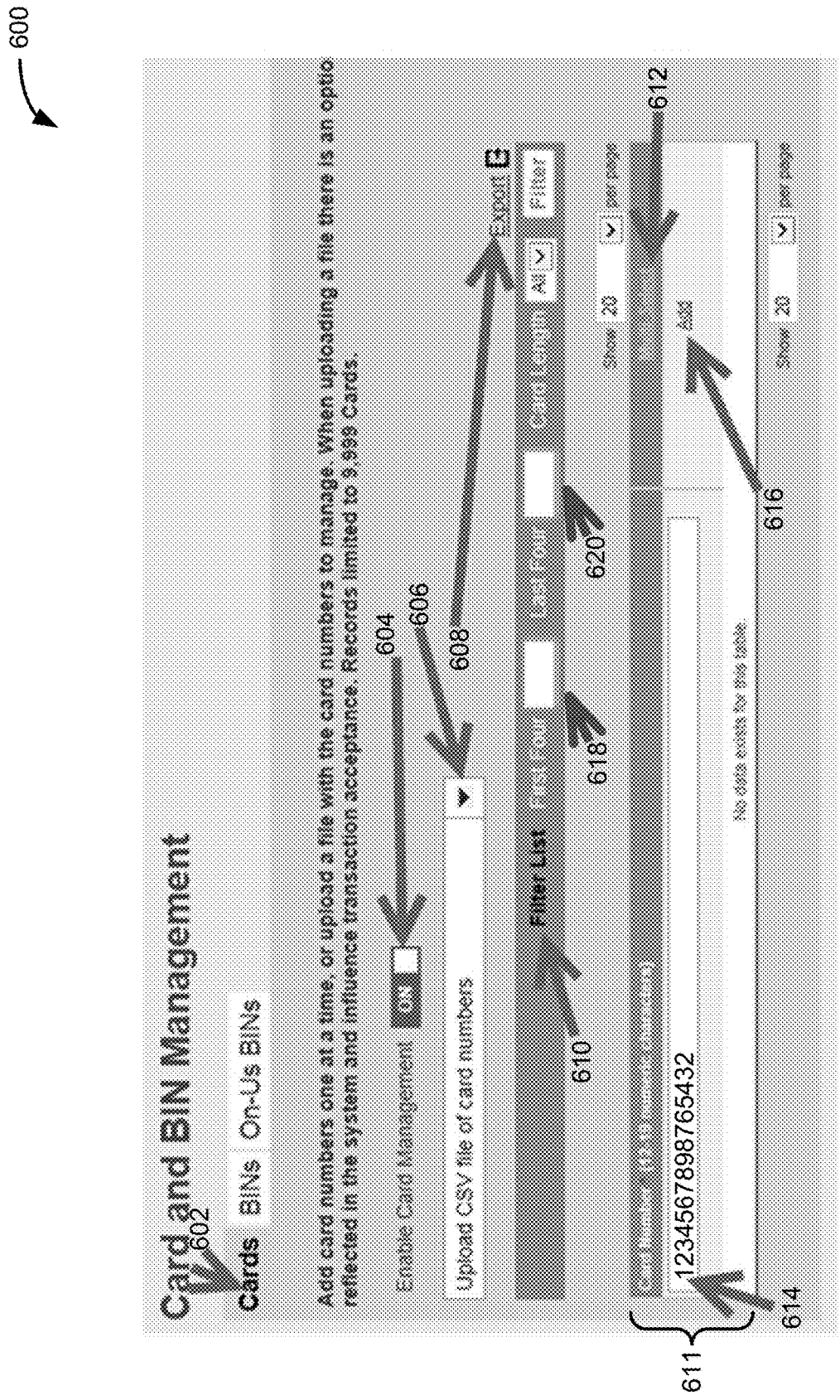
FIG. 6 shows a screenshot of an exemplary GUI for managing the filtering of one or more PANs in accordance with some embodiments.

Returning to FIG. 4, at step 404, the server computer uses the set of credentials received at step 402 to retrieve one or more PANs that are being filtered for the acquirer. In general, acquirers may encounter fraud that is associated with one or more particular PANs. For instance, a stolen payment device or a compromised payment account that is associated with a particular PAN may be used to perform a number of fraudulent transactions with a number of merchants, each of whom have a business relationship with the acquirer. Once the acquirer has determined that the PAN is being used to perform fraudulent transactions, the acquirer may wish to filter all authorization request messages that are transmitted on behalf of transactions that involve the PAN (i.e., filter the PAN). As the acquirer determines more PANs that are linked to fraudulent transactions, the acquirer may build up a list of PANs that need to be filtered. To facilitate the acquirer in managing the list of PANs that need to be filtered, the web interface may provide a PAN filter management webpage that is depicted in FIG. 6. Through the PAN filter management webpage, an administrator may create and manage rules for filtering authorization request messages associated with problematic PANs. It should be noted that these rules may be acquire-wide; the rules may be applied to any authorization request message irrespective of the merchant from which the request message originated from.

To retrieve PANs that are being filtered on behalf of the acquirer, the server computer 302 may use the set of credentials received at step 402 to determine the acquirer associated with the administrator. Once the acquirer has been determined, the server computer may retrieve, from the rules database 332, data (e.g., rules) specific to the acquirer and use the data to determine one or more PANs associated with the acquirer. For each of these one or more PANs, if the PAN is involved in a transaction that is to be received by the acquirer, the resulting authorization request message is filtered regardless of which merchant the request message originates from.

It should be noted that if any of the one or more PANs is involved in a transaction (e.g., a payment device or payment account comprising one of the PANs is used) that is directed towards the acquirer, that transaction is filtered regardless of the merchant involved.

At step 406, the server computer transmits the list of PANs being filtered for the acquirer to the administrator client device. In particular, the server computer may cause the administrator client device 222 to display the list of PANs by transmitting, to the device, the PAN filter management webpage, which includes the list of PANs and controls for managing the list of PANs. In some embodiments, to access the PAN filter management webpage after logging into the web interface at step 402, administrator may click on one or more links that lead to the webpage.

At step 408, the server computer receives one or more new PANs from the administrator client device. For example, in response to detecting one or more new PANs that are each associated with one or more detected fraudulent transactions, the administrator may enter the one or more new PANs into fields provided by the PAN filter management webpage and submit the form. When the form is submitted, the administrator client device may transmit data comprising the one or more new PANs to the server computer.

At step 410, the server computer updates the ruleset associated with the acquirer to filter any authorization request messages that involve any of the one or more new PANs. In particular, the server computer may update one or more entries across one or more tables within the rules database 332 based on the one or more new PANs received in step 408. As a result of updating the ruleset, any authorization request message that is transmitted on behalf of a transaction will now be filtered if the transaction involves any of the one or more new PANs.

At step 412, the server computer transmits an updated list of PANs, which includes the one or more new PANs submitted by the administrator in step 408, to the administrator client device. In particular, the server computer may cause the administrator client device 222 to display the updated list of PANs by retransmitting, to the device, the PAN filter management webpage, which includes the updated list of PANs. Hence, by having the administrator periodically update the list of PANs with new PANs associated with recently detected fraudulent transactions, the acquirer may prevent further attempts to use these PANs to conduct fraudulent transactions.

FIG. 6 shows a screenshot of an exemplary graphical user interface (GUI) 600 for managing the filtering of one or more PANs in accordance with some embodiments. It should be noted that while the embodiment depicted in the screenshot equates PANs with 12-19 number credit card numbers, this is not intended to be limiting. For example, in other embodiments, a PAN may correspond to the portion of a credit card number that does not include the BIN of the credit card number. To access the PAN filter management webpage, the administrator may click on the button 602. In the shown interface, the table 611 lists each PAN that is configure to be filtered on behalf of the acquirer. It should be noted that while the screenshot depicts the table 611 has comprising a single PAN, this is not intended to be limiting as the table may comprise multiple PANs. In particular, the table may be populated using rules and other data retrieved from the rules database 332. To add new PANs to the table, the administrator may upload a file (e.g., comma separated values file (CSV)) containing the new PANs by clicking on the button 606 and selecting the file from the file selection dialog. In some embodiments, uploading the file to the webpage may erase all existing PANs in the table before repopulating the table with the PANs contained in the file. Alternatively, the administrator may manually input PANs into text fields provided by the table. For example, assuming the card number field 614 is initially empty, the administrator may type a PAN into the card number field 614 and press the add button 616 to submit the form.

The administrator may activate and de-activate PAN filtering for the acquirer by toggling the switch 604. When the switch 604 is set to "ON," each PAN listed in the table is filtered. When the switch 604 is set to "OFF," the PANs in the table are ignored. Thus, the switch 604 may be used to deactivate PAN filtering for a short period of time without having to modify the table 611.

To search for a particular subset of PANs in the table, the administrator may use the fields 610 to have the table display only PANs whose first four digits match those entered in the field 618, PANs whose last four digits match those entered in the field 620, or PANs whose digits match those entered into fields 618 and 620. To perform operations (e.g., delete) on multiple PANs in the table, the administrator may click on the button 612. To export the PANs in the table to a file, the administrator may click on the button 608.

B. Configuring BIN Filtering

Figure 7:
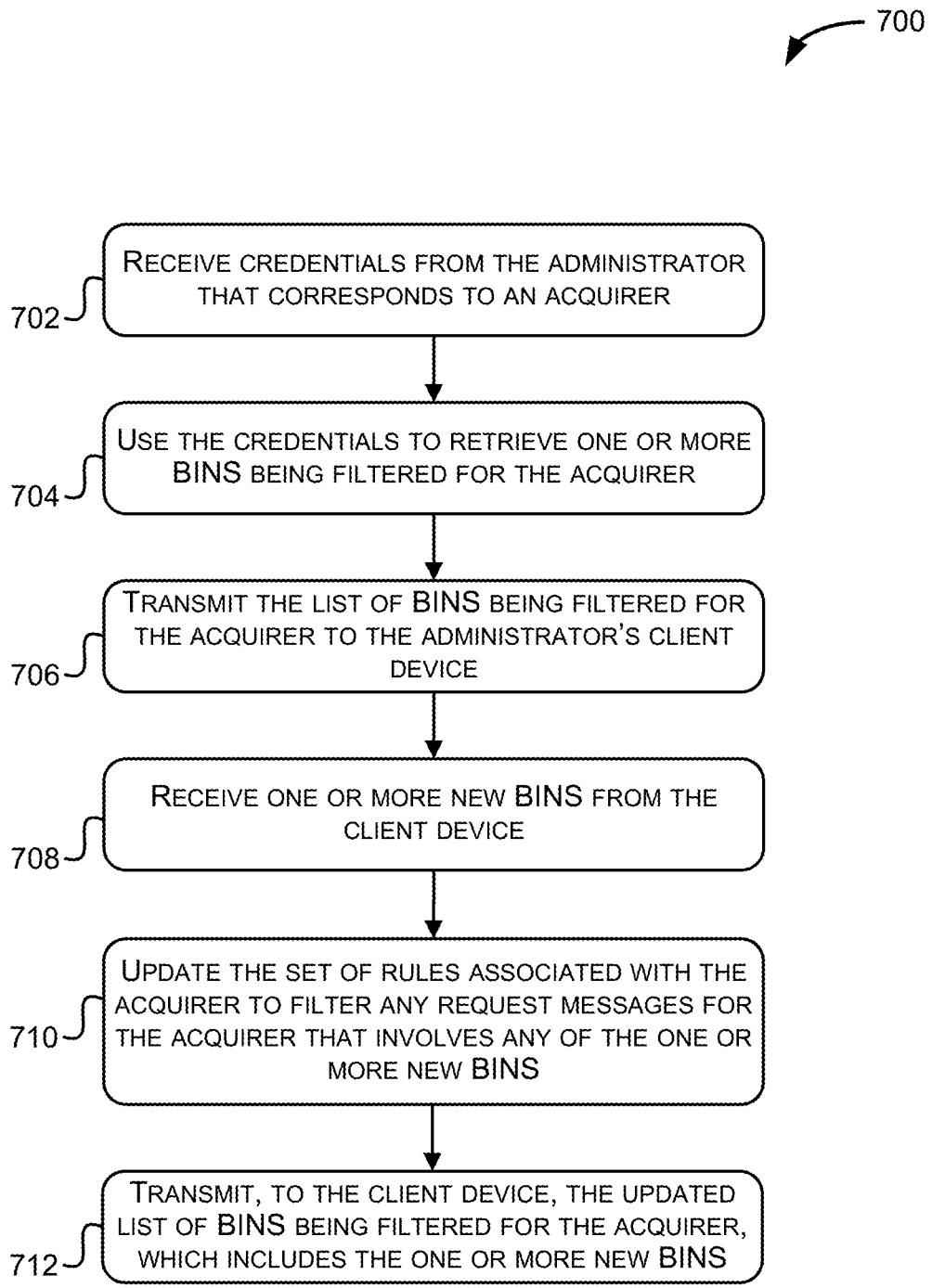
FIG. 7 shows a flowchart illustrating an exemplary method of managing the filtering of one or more bank identification numbers (BINs) in accordance with some embodiments.

FIG. 7 shows a flowchart illustrating an exemplary method 700 of managing the filtering of one or more bank identification numbers (BINs) in accordance with some embodiments.

In FIG. 7, at step 702, a server computer receives a set of credentials from the administrator client device. In providing the set of credentials, the administrator 224 may obtain access to the web interface in a sequence similar to the one described above for the flowchart in FIG. 4.

At step 704, the server computer uses the set of credentials received at step 702 to retrieve one or more BINs that are being filtered for the acquirer. In general, acquirers may encounter fraud that is associated with one or more BINs. For instance, a set of stolen payment devices or compromised payment accounts, each of which may be associated with a particular BIN (e.g., account numbers associated with the payment devices or payment accounts each comprise the BIN), may be used to perform a number of fraudulent transactions with a number of merchants, each of whom have a business relationship with the acquirer. Once the acquirer has determined that a number of fraudulent credit cards comprise a particular BIN, the acquirer may wish to filter all authorization request messages that are transmitted on behalf of transactions that involve the BIN (i.e., filter the BIN).

Figure 8:
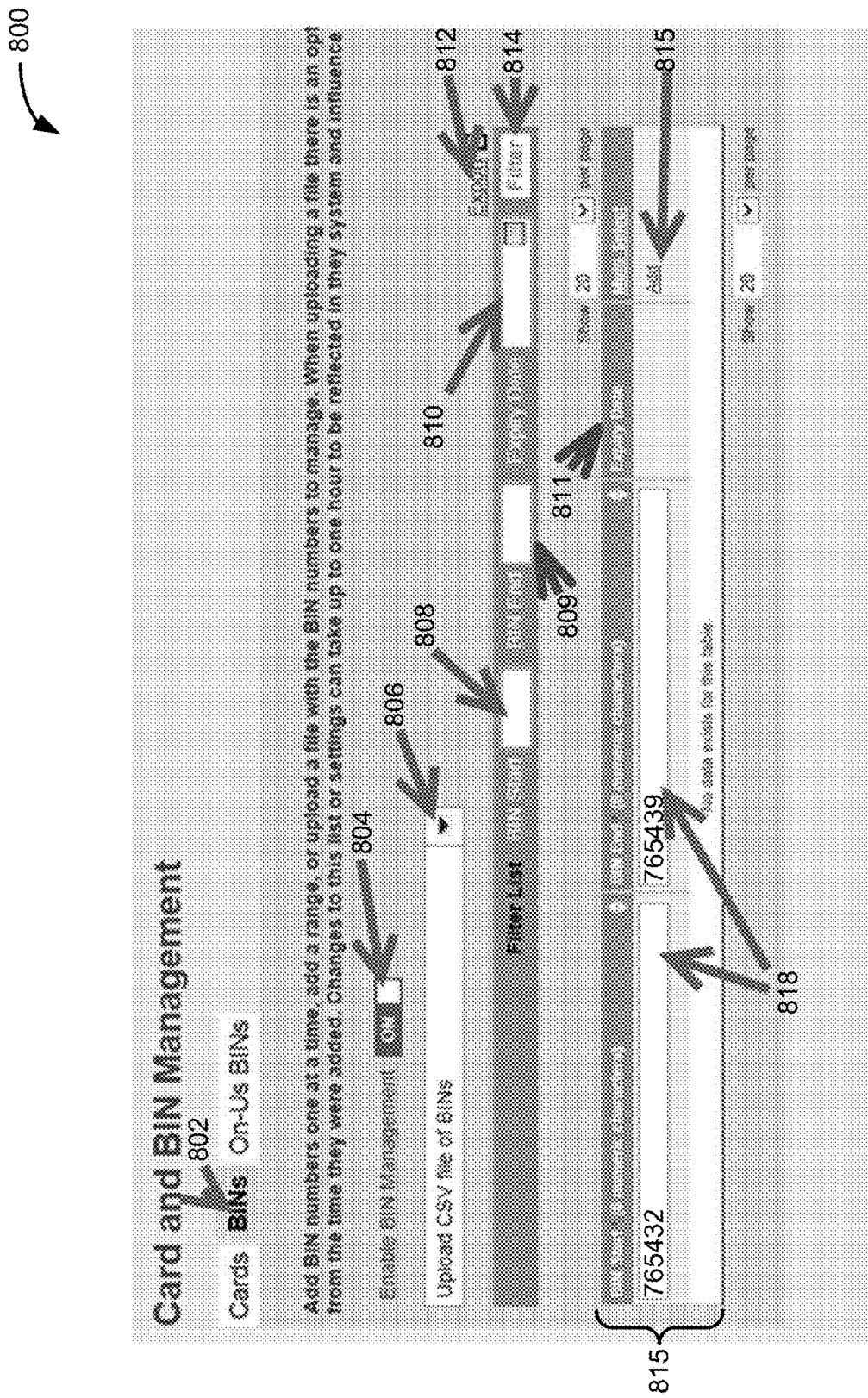
FIG. 8 shows a screenshot of an exemplary GUI for managing the filtering of one or more BINs in accordance with some embodiments.

As the acquirer determines more BINs that are linked to fraudulent transactions, the acquirer may build up a ranges of consecutive BINs that need to be filtered (i.e., BIN ranges). To facilitate the acquirer in managing the list of BINs that need to be filtered, the web interface may provide a BIN filter management webpage that is depicted in FIG. 8. Through the BIN filter management webpage, an administrator may create and manage rules for filtering authorization request messages associated with problematic BINs. It should be noted that these rules may be acquire-wide; the rules may be applied to any authorization request message irrespective of the merchant from which the request message originated from. Because multiple payment devices or payment accounts may share the same BIN, filtering a particular BIN may effectively filter multiple payment devices or payment accounts.

To retrieve BINs that are being filtered on behalf of the acquirer, the server computer 302 may use the set of credentials received at step 702 to determine the acquirer associated with the administrator. The server computer may retrieve, from the rules database 332, data (e.g., rules) specific to the acquirer and use the data to determine one or more BINs configured to be filtered on behalf of with the acquirer. For each of these one or more BINs, if the BIN is involved in a transaction that is to be received by the acquirer, the resulting authorization request message is filtered regardless of which merchant the request message originates from.

At step 706, the server computer transmits the list of BINs being filtered for the acquirer to the administrator client device. In particular, the server computer may cause the administrator client device 222 to display the list of BINs by transmitting, to the device, the BIN filter management webpage, which includes the list of BINs and controls for managing the list of BINs. In some embodiments, to access the BIN filter management webpage after logging into the web interface at step 702, the administrator may click on one or more links that lead to the webpage.

At step 708, the server computer receives one or more new BINs from the administrator client device. For example, in response to detecting one or more new BINs that are each associated with one or more detected fraudulent transactions, the administrator may enter the one or more new BINs into fields provided by the BIN filter management webpage and submit the form. When the form is submitted, the administrator client device may transmit data comprising the one or more new BINs to the server computer.

At step 710, the server computer updates the ruleset associated with the acquirer to filter any authorization request messages that involve any of the one or more new BINs. In particular, the server computer may update one or more entries across one or more tables within the rules database 332 based on the one or more new BINs received in step 708. As a result of updating the ruleset, any authorization request message that is transmitted on behalf of a transaction will now be filtered if the transaction involves any of the one or more new BINs.

At step 712, the server computer transmits an updated list of BINs, which includes the one or more new BINs submitted by the administrator in step 708, to the administrator client device. In particular, the server computer may cause the administrator client device 222 to display the updated list of BINs by retransmitting, to the device, the BIN filter management webpage, which includes the updated list of BINs. Hence, by having the administrator periodically update the list of BINs with new BINs associated with recently detected fraudulent transactions, the acquirer may prevent further attempts to use payment devices or payment accounts associated with these BINs in future fraudulent transactions.

FIG. 8 shows a screenshot of an exemplary GUI 800 for managing the filtering of one or more BINs in accordance with some embodiments. To access the BIN filter management webpage, the administrator may click on the button 802. In the shown interface, the table 815 display a list of BIN ranges, where each BIN in each of the ranges is configured to be filtered on behalf of the acquirer. It should be noted that while the table 815 visually organizes BINs into ranges, this is not intended to be limiting as, in other embodiments, BINs may be visually organized in different ways within the webpage. Additionally, while the table 815 is shown to comprise one BIN range, this is also not intended to be limiting as the table may comprise multiple ranges. In particular, the table may be populated using rules and other data retrieved from the rules database 332. To add new BIN ranges to the table, the administrator may upload a file (e.g., CSV file) containing the new BIN ranges by clicking on the button 806 and selecting the file from the file selection dialog.

In some embodiments, uploading the file to the webpage may erase all existing BIN ranges in the table before repopulating the table with the BIN ranges contained in the file. Alternatively, the administrator may manually input BINs into text fields provided by the table. For example, assuming the start and fields 818 are initially empty, the administrator may type a starting BIN that denotes the start of a new BIN range and an ending BIN that denotes the end of the new BIN range into the fields 818 and press the add button 815 to submit the form. As shown in the table, each entry in the table includes a start of the BIN range, an end of the BIN range, and an expiration date (shown in column 811) that denotes when the BIN range expires. In order to comply with certain guidelines, some embodiments may automatically remove BIN ranges from the table after a certain period of time (e.g., 14 days) has passed after the BIN range's addition to the table.

The administrator may activate and de-activate BIN filtering for the acquirer by toggling the switch 804. When the switch 804 is set to "ON," each BIN of each of the BIN ranges listed in the table is filtered. When the switch 804 is set to "OFF," the BIN ranges in the table are ignored. Thus, the switch 804 may be used to deactivate PAN filtering for a short period of time without having to modify the table 815.

To search for a particular subset of BIN ranges in the table, the administrator may enter digits into the field 808 to display only BINs whose first four digits match the digits entered into the field 808, enter digits into the field 809 to display only BINs whose last four digits match the digits entered into the field 809, or enter digits into both fields 808 and 809 to display only BINs whose digits match those entered into the fields 808 and 809 and pressing the button 814. Additionally, the administrator may enter a particular date into the field 810 search for BIN ranges that will expire on the entered date. To export the BIN ranges in the table to a file, the administrator may click on the button 812.

C. Configuring BIN Identification

Figure 9:
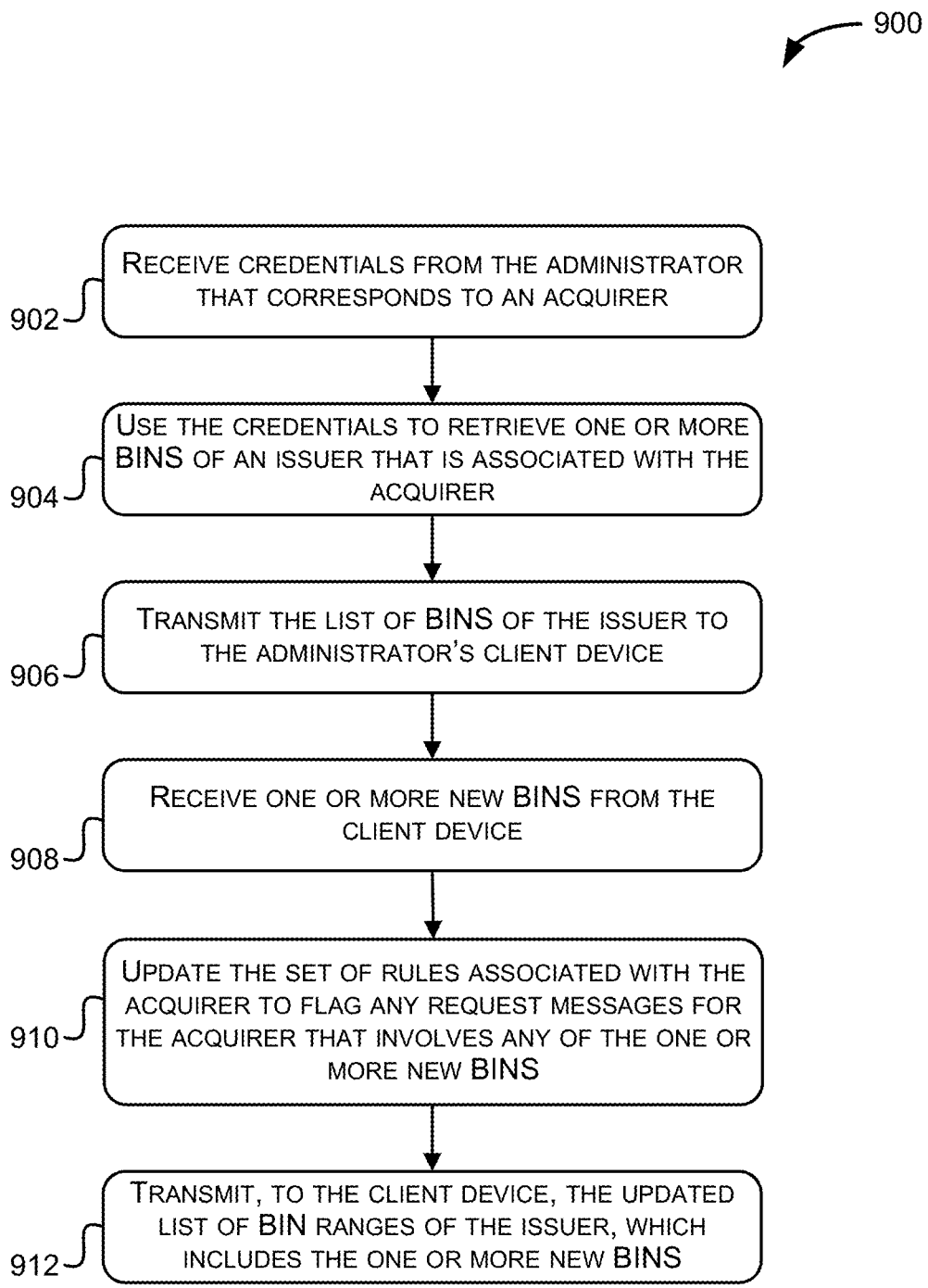
FIG. 9 shows a flowchart illustrating an exemplary method of managing one or more BINs that are issued by an issuer computer in accordance with some embodiments.

FIG. 9 shows a flowchart illustrating an exemplary method 900 of managing one or more identification numbers BINs that are issued by an issuer computer in accordance with some embodiments.

In FIG. 9, at step 902, a server computer receives a set of credentials from the administrator client device. In providing the set of credentials, the administrator 224 may obtain access to the web interface in a sequence similar to the one described above for the flowchart in FIG. 4.

Figure 10:
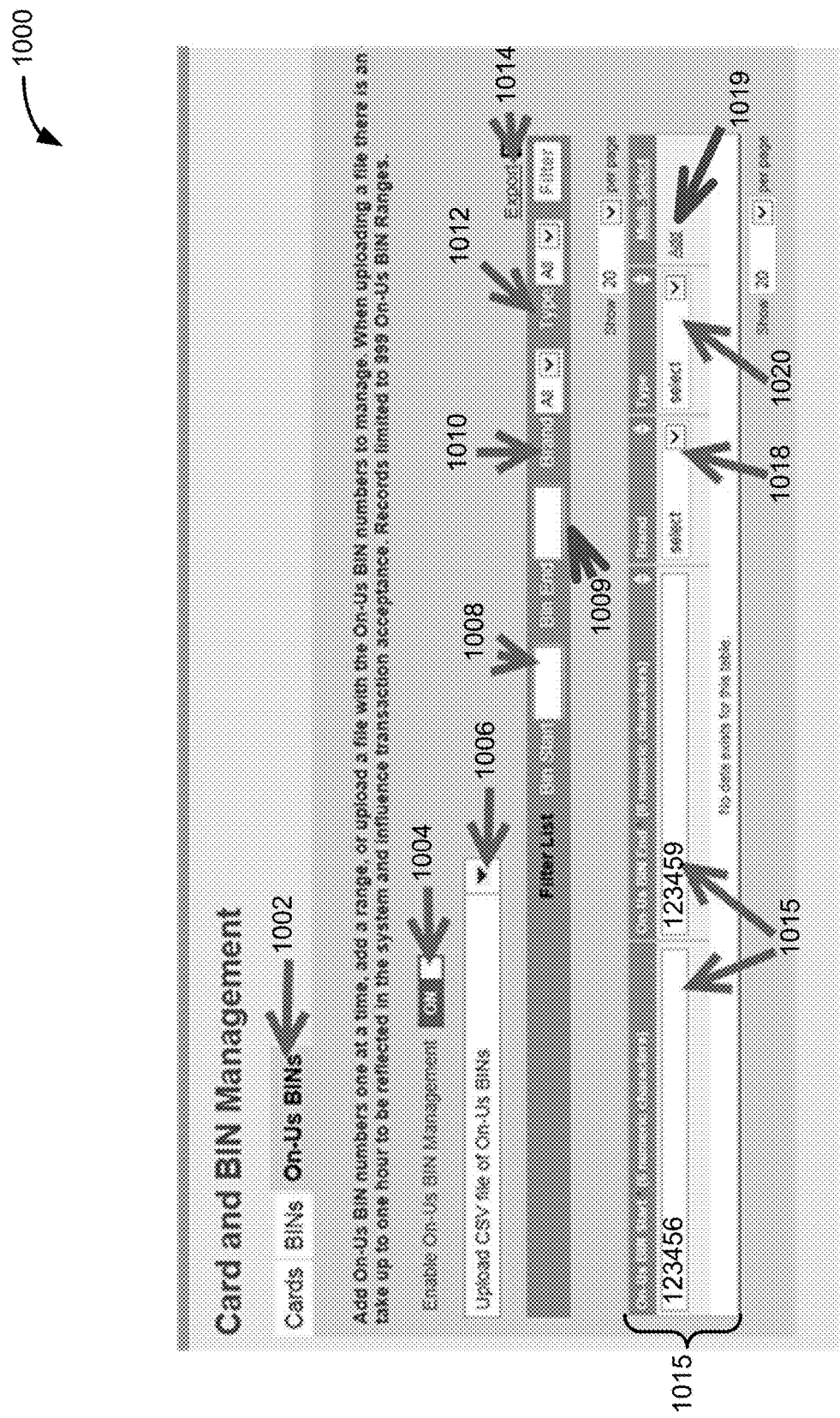
FIG. 10 shows a screenshot of an exemplary GUI for managing the one or more BINs that are issued by the issuer computer in accordance with some embodiments.

At step 904, the server uses the set of credentials received at step 902 to retrieve one or more BINs that are issued by an issuer that is associated with the acquirer. It should be noted that in some embodiments, the acquirer that operates the acquirer computer 218 in FIG. 2 may be the same entity as the issuer that operates the issuer computer 216. In other words, some acquirers may, in addition to facilitating clearing and settlement of electronic payment transactions, maintain financial accounts for consumers and issue payment accounts and consumer payment devices. In such embodiments, the payment accounts or devices issued by the acquirer (or an issuer that is associated with the acquirer) may be associated with a designated range of BINs that are associated with (i.e., maintained by) the acquirer. Here, the acquirer may wish to treat these BINs, which may be referred to as "On-Us" BINs, differently from BINs not associated with payment accounts/devices issued by the acquirer, which may be referred to as "Off-Us" BINs. For example, the acquirer may (1) filter authorization request messages that involve On-Us BINs differently (e.g., be more permissive towards On-Us transactions) from those that involve only Off-Us BINs, (2) process transactions that involve an On-Us BIN more quickly, or (3) settle transactions that involve an On-Us BIN more quickly. However, to facilitate the gateway 212 in identifying authorization request messages that are transmitted on behalf of a transaction that was performed with a payment account or a payment device that comprises an On-Us BIN (i.e., to identify On-Us request messages), the acquirer can provide a set of On-Us BIN ranges to the gateway using the On-Us BIN management webpage provided by the web interface, which is depicted in FIG. 10. Through the On-Us BIN management webpage, an administrator may create and manage rules for flagging or identifying On-Us request messages for later processing by other rules (e.g., a merchant-specific ruleset). It should be noted that these rules may be acquire-wide; the rules may be applied to any authorization request message irrespective of the merchant from which the request message originated from.

To retrieve On-Us BINs associated with the acquirer, the server computer 302 may use the set of credentials received at step 902 to determine the acquirer associated with the administrator. The server computer may retrieve, from the rules database 332, data (e.g., rules) specific to the acquirer and use the data to determine one or more On-Us BINs associated with the acquirer.

At step 906, the server computer transmits the list of the one or more On-Us BINs associated with the acquirer to the administrator client device. In particular, the server computer may cause the administrator client device 222 to display the list of BINs by transmitting, to the device, the On-Us BIN management webpage, which includes the list of On-Us BINs and controls for managing the list of On-Us BINs. In some embodiments, to access the On-Us BIN management webpage after logging into the web interface at step 902, the administrator may click on one or more links that lead to the webpage.

At step 908, the server computer receives one or more new On-Us BINs from the administrator client device. For example, in response to generating one or more new On-Us BINs that may be used in payment accounts or payment devices, the administrator may enter the one or more new On-Us BINs into fields provided by the On-Us BIN management webpage and submit the form. When the form is submitted, the administrator client device may transmit data comprising the one or more new On-Us BINs to the server computer.

At step 910, the server computer updates the ruleset associated with the acquirer to flag any authorization request messages that involve any of the one or more new On-Us BINs. In particular, the server computer may update one or more entries across one or more tables within rules database 332 based on the one or more new On-Us BINs received in step 710. As a result of updating the ruleset, any authorization request message that is transmitted on behalf of a transaction will be identified as an On-Us request message if the transaction involves any of the one or more new On-Us BINs (i.e., each of the new On-Us BINs will be flagged).

At step 912, the server computer transmits the updated list of On-Us BINs, which includes the one or more new On-Us BINs submitted by the administrator in step 908, to the administrator client device. In particular, the server computer may cause the administrator client device to display the updated list of BINs by retransmitting, to the device, the On-Us BIN management webpage, which includes the updated list of On-Us BINs. Hence, by having the administrator periodically update the list of On-Us BINs whenever the acquirer generates new On-Us BINs, the acquirer may enable the server computer to consistently identify and flag On-Us request messages for later processing.

FIG. 10 shows a screenshot of an exemplary GUI 1000 for managing the one or more BINs that are issued by the issuer computer in accordance with some embodiments.

To access the On-Us BIN management page, the administrator may click on the button 1002. In the shown interface, the table 1015 displays a list of ranges of On-Us BINs, where each BIN in each of the ranges is configured to be flagged on behalf of the acquirer. It should be noted that while the table 1015 visually organizes BINs into ranges, this is not intended to be limiting as, in other embodiments, BINs may be visually organized in different ways within the webpage. Additionally, while the table 1015 is shown to comprise one On-Us BIN range, this is also not intended to be limiting as the table may comprise multiple ranges. In particular, the table may be populated using rules and other data retrieved from the rules database 332. To add new On-Us BIN ranges to the table, the administrator may upload a file (e.g., CSV file) containing the new On-Us BIN ranges by clicking on the button 1006 and selecting the file from the file selection dialog. In some embodiments, uploading the file to the webpage may erase all existing On-Us BIN ranges in the table before repopulating the table with the On-Us BIN ranges contained in the file. Alternatively, the administrator may manually input On-Us BINs into text fields provided by the table. For example, assuming that the fields 1015 are initially empty, the administrator may type a starting BIN that denotes the start of a new On-Us BIN range and an ending BIN that denotes the end of the new On-Us BIN range into the fields 1016, select the brand associated with the BINs (e.g., VISA, MasterCard) using drop down list 1018, select the card type associated with the BINs (e.g., debit cards, credit cards) using dropdown list 1020, and press the button 1019 to submit the form.

The administrator may activate and deactivate On-Us request message identification for the acquire by toggling the switch 1004.

To search for a particular subset of On-Us BIN ranges in the table, the administrator may enter digits into the field 1008 to display only On-Us BINs whose first four digits match the digits into the field 1008, enter digits into the field 1009 to display only BINs whose last four digits match the digits entered into the field 1009, or enter digits into both fields 1008 and 1009 to display only BINs whose digits match those entered into the fields 1008 and 1009. Additionally, the administrator may select a particular brand from drop down list 1010 to search for On-Us BIN ranges that match the brand and may select a particular type from drop down list 1012 to search for On-Us BIN ranges that match the card type. To export the On-Us BIN ranges in the table to a file, the administrator may click on the export button 1014.

It should be noted that some embodiment provides rules that are portfolio wide. In other words, one may create a rule that filters requests based on PANs, BINs, and/or On-Us BINs, as described above, except that the rule is applied to a portfolio of MIDs. Thus, any request that is associated with an MID that is part of the portfolio may be filtered by the rule. If the request is associated with an MID that is not part of the portfolio, the request is exempt from the filtering rule. Furthermore, some embodiments may enable the management of such portfolio wide rules through a graphical interface like the ones described above.

V. Configuring Merchant-Specific Rules

Figure 11:
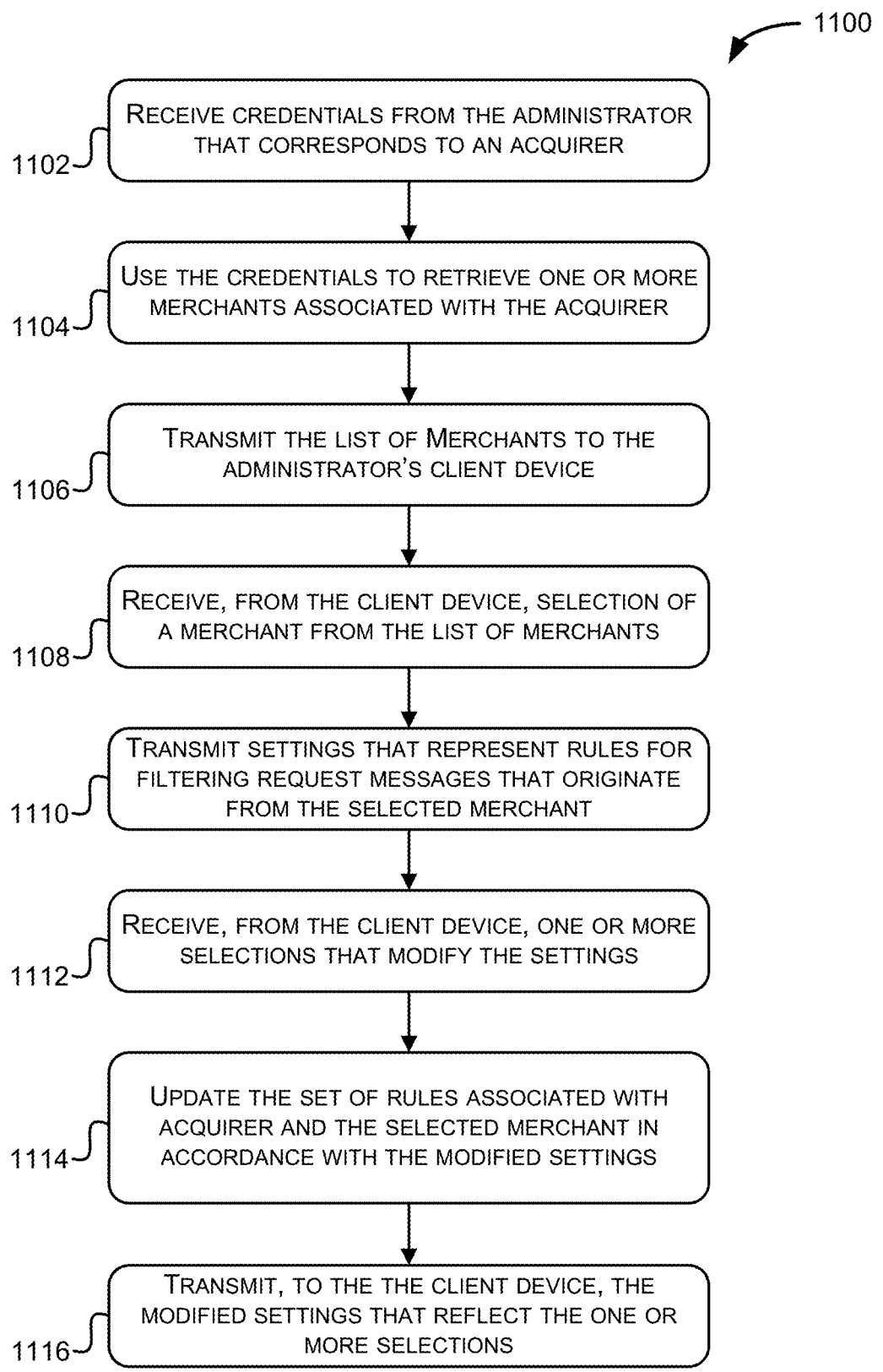
FIG. 11 shows a flowchart illustrating an exemplary method of selecting a requesting computer from a list of requesting computers and managing rules specific to the requesting computer in accordance with some embodiments.

FIG. 11 shows a flowchart illustrating an exemplary method 1100 of selecting a requesting computer from a list of requesting computers and managing rules specific to the requesting computer in accordance with some embodiments. In particular, the following section describes the management of rules that filter requests at the merchant level within a portfolio in reference to FIGS. 11-13.

In FIG. 11, at step 1102, a server computer receives a set of credentials from the administrator client device. In providing the set of credentials, the administrator 224 may obtain access to the web interface in a sequence similar to the one described above for the flowchart in FIG. 4.

At step 1104, the server uses the set of credentials received at step 1104 to retrieve the merchants that have been acquired by the acquirer. In particular, each of these merchants may have business relationships with the acquirer and may have configured a merchant computer to send authorization request messages to the acquirer. It should be noted that in contrast to FIGS. 4-10, which describe techniques for managing an acquirer-wide ruleset (i.e., rules that are applied to any authorization request message that is directed to the acquirer regardless of the merchant that generated the request message), FIGS. 11-13 describe techniques for managing rules that are targeted to a particular merchant (i.e., merchant-specific rules). Merchant-specific rules may be useful in dealing with problematic merchants, which may include merchants engaging in merchant fraud or merchants that, for one reason or another (e.g., negligence), are unintentional parties to a disproportionate amount of consumer fraud. Rules that focus on filtering all authorization request messages that (1) meet a specific set of criteria and (2) are from a problematic merchant may be more effective in preventing the fraud than rules that filter PANs and BINs acquirer-wide. Thus, to facilitate the administrator 224 in managing merchant-specific rules, the web interface may provide a merchant selection webpage where the administrator may select a merchant to configure rules for, which is described in further detail with respect to FIG. 12. For each merchant listed in the merchant selection webpage, the web interface may also provide a merchant rules management webpage where rules specific to the merchant are configured, which is described in further detail with respect to FIG. 13.

To retrieve merchants associated with the acquirer, the server computer 302 may use the set of credentials received at step 1102 to determine the acquirer associated with the administrator. The server computer may retrieve, from the rules database 332, data (e.g., rules) specific to the acquirer and the data to determine one or more merchants associated with the acquirer.

At step 1106, the server computer transmits the list of the one or more merchants associated with the acquirer to the administrator client device. In particular, the server computer may cause the administrator client device 222 to display the list of merchants by transmitting, to the device, the merchant selection webpage, which includes the list of merchants. In some embodiments, to access the merchant selection webpage after logging into the web interface at step 1102, the administrator may click on one or more links that lead to the webpage.

Figure 12:
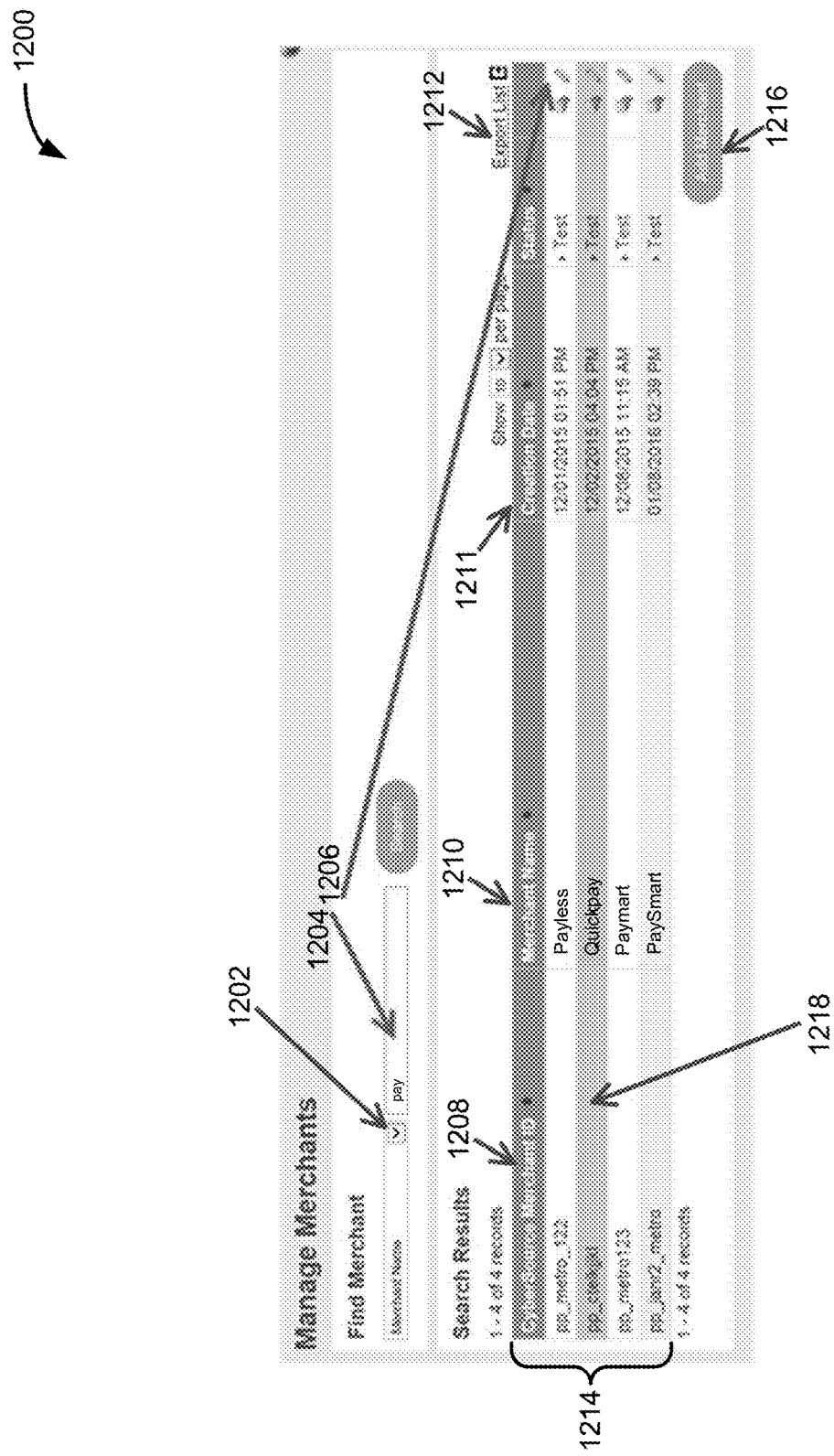
FIG. 12 shows a screenshot of an exemplary GUI for selecting the requesting computer from the list of requesting computers in accordance with some embodiments.

FIG. 12 shows a screenshot of an exemplary GUI 1200 for selecting the requesting computer from the list of requesting computers in accordance with some embodiments.

In the shown interface, the table 1214 displays a list of merchants (i.e., requesting computers) that are each associated with the acquirer, where each row of the table corresponds to a merchant and each cell of the row corresponds to an attribute of the merchant. Column 1208 corresponds to MIDs. A MID may be a unique identifier that is assigned to a merchant when the merchant is provided by the acquirer to the server computer. The MID may be automatically assigned or chosen by the acquirer. Column 1210 corresponds to merchant names. In general, the merchant name for a merchant is a name used by the public to identify the merchant. Merchant names may or may not be unique amongst the merchants associated with the acquirer. Column 1211 corresponds to dates when merchants were added to the table. For example, the second row 1218 of the table corresponds to a merchant that is named "QuickPay" and has the MID "pp_ctelkjjkl." As shown in the table, the second row 1218 was added on Dec. 2, 2015 at 4:04 PM. Each row in the table may provide an edit button that, when clicked, leads to a merchant rules management webpage for the merchant represented by the row. For example, clicking on button 1206 (the pencil icon shown in the first row of the table 1214) may forward the administrator to the merchant rules management webpage for the merchant "Payless."

To add a new merchant to the table, the administrator may click on button 1216, and enter the merchant's information (e.g., merchant name) into the set of forms that appear in response to the click. In some embodiments, the administrator may upload a file (e.g., CSV file) containing a list of merchants. In receiving the file, the server computer may empty the acquirer's merchant list before repopulating the list with the merchants in the file. In such embodiments, the file may contain, for each of the listed merchants, default settings for the merchant. In this fashion, the administrator may use the file upload feature to upload a list of merchants with default settings and use the merchant rule management webpage to customize settings for a merchant.

To display a subset of the merchants in the table or to search for a particular merchant, the administrator may choose a search criteria in drop down list 1202 and enter a search string in field 1204. In particular, the drop down list 1202 may enable the administrator to search via merchant name, MID, or creation date. While the screenshot depicts table 1214 as comprising four merchants (i.e., four rows), the table may actually comprise many more merchants. However, because the administrator is depicted to be searching for merchants whose merchant name contains "pay" as a substring, only merchants with names that fulfill this search criteria are displayed by the table.

To export the merchants in the table 1214 to a file, the administrator may click on the button 1212.

Returning to FIG. 11, at step 1108, the server computer receives, from the administrator client device, a selection of a merchant from the list of merchants. For example, in response to detecting a disproportionate number of fraudulent transactions from a particular merchant, the administrator may select the merchant (e.g., click on the edit button displayed in the row that corresponds to the merchant) to configure rules that are specific to the merchant.

At step 1110, the server computer transmits, to the administrator client device, one or more settings that represent rules for filtering authorization request messages that originate from the selected merchant. In particular, responsive to the selection received at step 1108, the server computer may cause the administrator client device 222 to display the settings by transmitting, to the device, the merchant rules management webpage. The merchant rules management webpage displays one or more settings (i.e., interactive controls) that visually represent rules specific to the merchant. By interacting with the one or more settings, the administrator may modify the underlying rules to filter authorization request messages from the merchant according to a particular set of criteria. The various criteria that the administrator may use to filter such request messages is further described below with respect to FIG. 13.

At step 1112, the server computer receives, from the client device, one or more selections that modify the settings. For example, in response to detecting a number of fraudulent transactions that involve foreign debit cards and originate from the selected merchant, the administrator may select a particular switch displayed in the webpage to indicate that authorization request messages stemming from transactions involving international debit cards should not be allowed through for this merchant. When the administrator submits the form, the administrator client device may transmit data comprising the one or more selections to the server computer.

At step 1114, the server computer updates the ruleset associated with the acquirer and the selected merchant in accordance with the modified settings. In particular, the server computer may update one or more entries across one or more tables within rules database 332 based on the one or more selections received in step 1112. As a result of updating the ruleset, any authorization request messages received from the selected merchant will be subjected to the updated ruleset. For example, in response to receiving the selection of the switch, the server computer may modify the ruleset associated with the merchant to filter authorization request messages stemming from transactions involving international debit cards.

At step 1116, the server computer transmits the modified settings that reflect the one or more selections to the administrator client device. In particular, the server computer may cause the administrator client device to display the modified settings by retransmitting, to the device, the merchant rules management webpage, in which the displayed settings reflect the modifications received in step 1112. Hence, whenever the acquirer receives a disproportionate number fraudulent transactions from a merchant, the acquirer may prevent future fraudulent transactions from that merchant by have the administrator configure the ruleset specific to the merchant to more strictly filter authorization request messages originating from the merchant.

Figure 13:
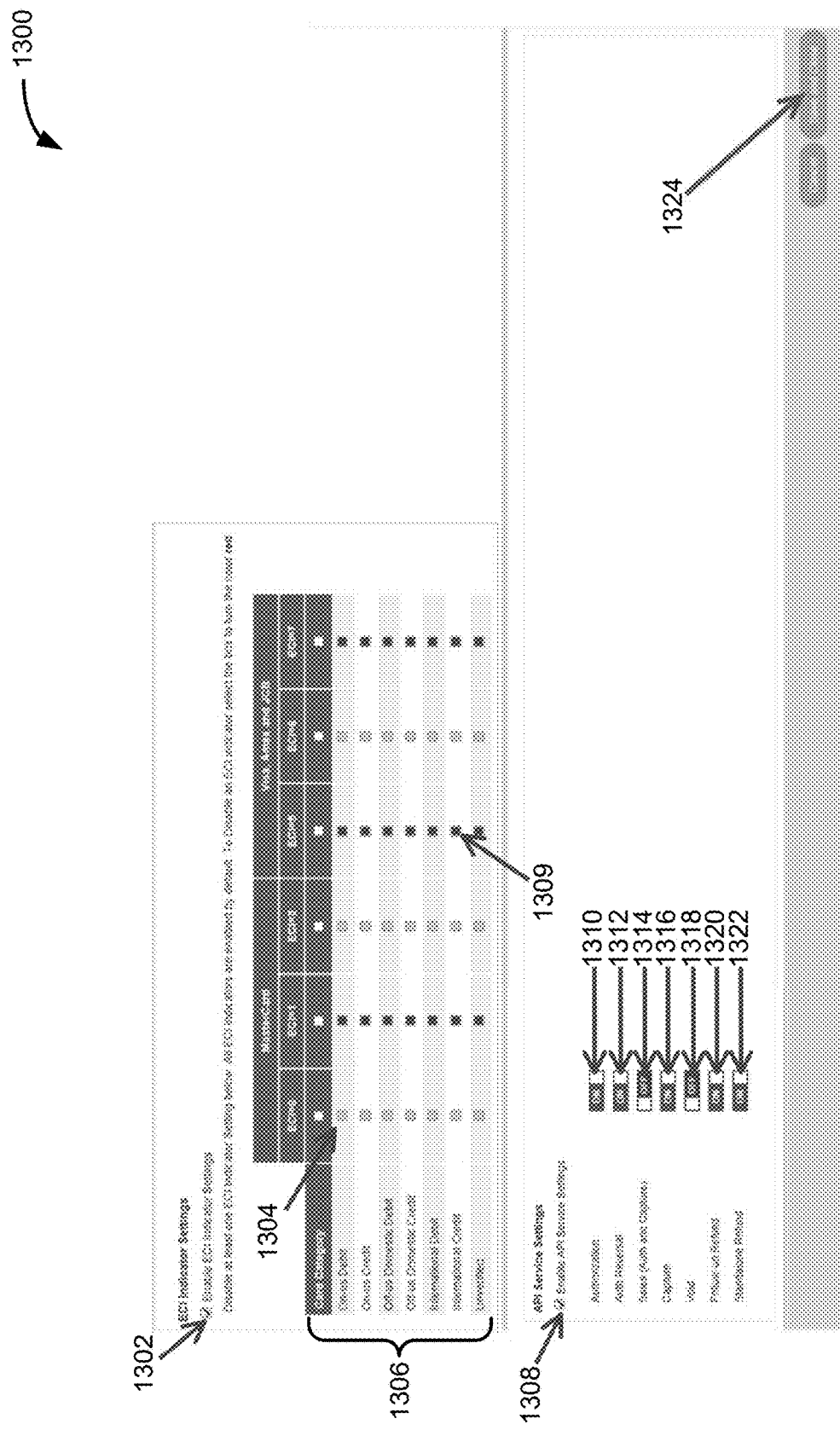
FIG. 13 shows a screenshot of an exemplary GUI for managing rules that are applied to requests originating from the selected requesting computer in accordance with some embodiments.

FIG. 13 shows a screenshot of an exemplary GUI 1300 for managing rules that are applied to authorization request messages originating from the selected requesting computer in accordance with some embodiments.

In the shown interface, the table 1306 comprises settings for filtering authorization request messages based on ECI values. The table displays a two-dimensional grid of switches, where each switch corresponds to a setting that affects which request messages are allowed or denied, each row of switches corresponds to a type of payment device, and each column of switches corresponds to an ECI value. In particular, the types of payment devices represented by the rows may comprise On-Us debit cards (i.e., debit cards issued by the acquirer), On-Us credit cards (i.e., credit cards issued by the acquirer), Off-Us domestic debit cards (i.e., domestic debit cards issued by another entity), Off-Us domestic credit cards (i.e., domestic credit cards issued by another entity), international debit cards, international credit cards, and unverified cards. As shown in the screenshot, ECI value ranges may differ amongst payment processing networks. For example, a first payment processing network may support ECI values 0-2 while a second payment processing network supports values between 5-7. In other words, each switch in the table may correspond to an intersection between a type of payment device and an ECI value. Each switch in the table may be set to one of two values: "green," which corresponds to allowing authorization request messages that match the type of payment device and the ECI value that the switch represents and "red," which corresponds to denying authorization request messages that match the same. Therefore, by selecting (i.e., checking) different combinations of switches within the table, the administrator can customize a ruleset specific to the merchant that is able to substantially lower the number of fraudulent transactions that are allowed to proceed without significantly affecting the flow of legitimate transactions.

For example, the administrator may set switch 1304 to green so that the rules are modified to always allow authorization request messages that (1) originate from the selected merchant, (2) stem from transactions involving an On-Us debit card and (3) have an ECI value of 0. Additionally, administrator may set switch 1309 to red so that the rules are modified to always deny authorization request messages that (1) originate from the selected merchant, (2) stem from transactions involving an international credit card, and (3) have an ECI value of 5.

It should be noted that acquirers may be particularly interested in filtering authorization request based on their ECI values because whether or not the acquirer is liable for a fraudulent transaction may depend on the ECI value of the transaction's authorization request message. For example, if a particular ECI value indicates that the issuer will liable for the transaction, the acquirer may wish to allow authorization request messages that have this ECI value.

The administrator may activate and deactivate the filtering of authorization request messages based on ECI values by toggling the switch 1302.

In the shown interface, the switches 1310-1322 correspond to settings for filtering various types of request messages based on API service requested. It should be noted that, based on the relationship a merchant has with the acquirer, the processor, and/or the payment processing network, the merchant may have the ability to transmit various types of request messages other than authorization request messages. In particular, the acquirer/processor/payment processing network may implement an API that provides merchants the ability to transmit different types of request messages, which each correspond to a particular aspect or step of a consumer payment device-based transaction, including authorization request messages, auth reversal request messages, auth and capture and capture request messages, capture request messages, void request messages, follow-on refund request messages and standalone refund request messages. However, because certain types of requests may be more susceptible to fraud (e.g., standalone refund requests), the acquirer may wish to block riskier types of request messages that originate from suspicious merchants but continue to allow less risky request messages (e.g., authorization requests) that originate from the same merchants.

Each of the switches 1310-1322 corresponds to a setting to block a certain type of request message. In particular, setting switch 1310, switch 1312, switch 1314, switch 1316, switch 1318, switch 1320, and switch 1322 to red may block authorization request messages, auth reversal request messages, auth and capture request messages, capture request messages, void request messages, follow-on refund request messages, and standalone-refund request messages respectively. As shown in the screenshot, the administrator has configured the ruleset specific to the merchant to deny all sales request messages and void request messages but not authorization request messages, auth reversal request messages, capture request messages, follow-on refund request messages, and standalone refund request messages.

The administrator may activate and deactivate the filtering of request messages based on which API service is requested by toggling the switch 1308.

After making one or more selections in the merchant rule management webpage, the administrator may transmit these selections to the server computer by clicking on the button 1324.

VI. Request Message Processing Flow

Figure 14:
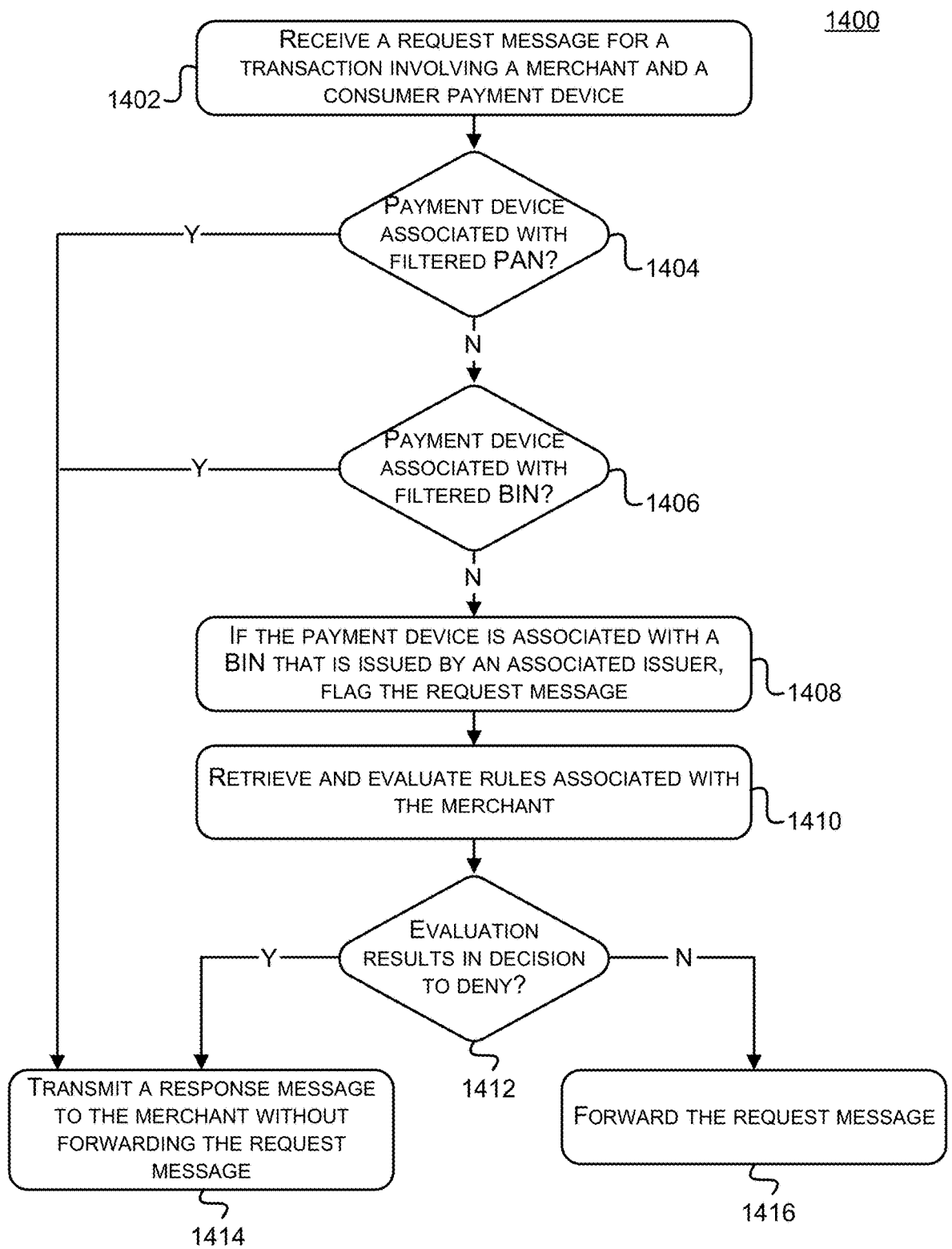
FIG. 14 shows a flowchart illustrating an exemplary method of processing request messages using acquirer rules in accordance with some embodiments.

FIG. 14 shows a flowchart illustrating an exemplary method 1400 of processing request messages using acquirer rules in accordance with some embodiments.

At step 1402, the server computer receives a request message transmitted on behalf of a transaction involving a merchant and a consumer payment device. For example, a consumer may use the consumer payment device to purchase an item from the merchant. During the transaction, an authorization request message is generated and transmitted to the server computer.

At decision 1404, the server computer determines whether the transaction that gave rise to the request involves a payment account or a payment device associated with a PAN that is configured to be filtered by the gateway 212. In particular, rules module 316 may retrieve a ruleset associated with the acquirer (i.e., acquirer-wide rules) from the rules database 332 to determine whether an active PAN filter that targets the PAN of the consumer payment device exists in the rules. If the active PAN filter exists, the method 1400 can proceed to step 1414. If, however, the PAN filter does not exist or is not active, the method 1400 can instead proceed to decision 1406.

At decision 1406, the server computer determines whether the transaction that gave rise to the request involves a payment account or a payment device associated with a BIN that is configured to be filtered by the gateway 212. In particular, rules module 316 may retrieve a ruleset associated with the acquirer (i.e., acquirer-wide rules) from the rules database 332 to determine whether an active BIN filter that targets a BIN that is associated with the consumer payment device exists in the rules. If the active BIN filter exists, the method 1400 can proceed to step 1414. If, however, the BIN filter does not exist or is not active, the method 1400 can instead proceed to step 1408.

At step 1408, the server computer flags the request message if it is determined that the payment account or the payment device is associated with a BIN that is issued by an issuer that is associated with the acquirer. In other words, the server computer determines whether the BIN is an On-Us BIN that was issued by the acquirer or an issuer that is associated with the acquirer. If the BIN is an On-Us BIN, the server computer may flag the request message. In doing so, the server computer may subject the request message to processing by rules specific to On-Us BINs in decision 1412.

At step 1410, the server computer retrieves and evaluates rules associated with the merchant. In particular, rules module 316 may retrieve a ruleset associated with both the acquirer and the merchant from the rules database 332 and evaluate the merchant-specific rules with regards to the request message to determine whether the request message should be allowed or denied. In doing so, the rules module may consider, among other attributes of the request message, the request message's ECI value, the type of payment device used in the transaction (e.g., whether the payment device is domestic or international), and API service being requested.

At decision 1412, the server computer determines, based on the evaluation of the merchant-specific rules, whether to deny the request message. If the evaluation results in a decision to deny the request message, the method 1400 can proceed to step 1414. If, however, the evaluation results in a decision to allow the message, the method 1400 can proceed to step 1416.

At step 1414, the server computer transmits a response message to the merchant without forwarding the request message. In particular, the evaluation of the acquire-wide rules and the merchant-specific rules results in a decision to deny the request message. Accordingly, the server computer can transmit a response message to the merchant that indicates that the request was declined without forwarding the request message to the acquirer, the issuer, or the payment processing network. For example, if the rules module determines that an authorization request message that was received from a merchant should not be allowed through because of a merchant-specific rule, the server computer would transmit, to the merchant, an authorization response message indicating that the authorization request is declined.

At step 1416, the server computer forwards the request message. If the evaluation of the acquire-wide rules and the merchant-specific rules results in a decision to deny the request message, the server computer may forward the request message to the acquirer, the processor, and/or the payment processing network for further processing. At a later point in time, the server computer may receive, from the acquirer, the processor, or the payment processing network, a response message that indicates whether the request was accepted or declined. In response, the server computer may forward the response message to the merchant.

VII. Computer Apparatus

The various participants and elements described herein with reference to FIGS. 1-14 may operate one or more computer apparatuses to facilitate the functions described herein. Any of the elements in FIGS. 1-3, including any servers or databases, may use any suitable number of subsystems to facilitate the functions described herein.

Figure 15:
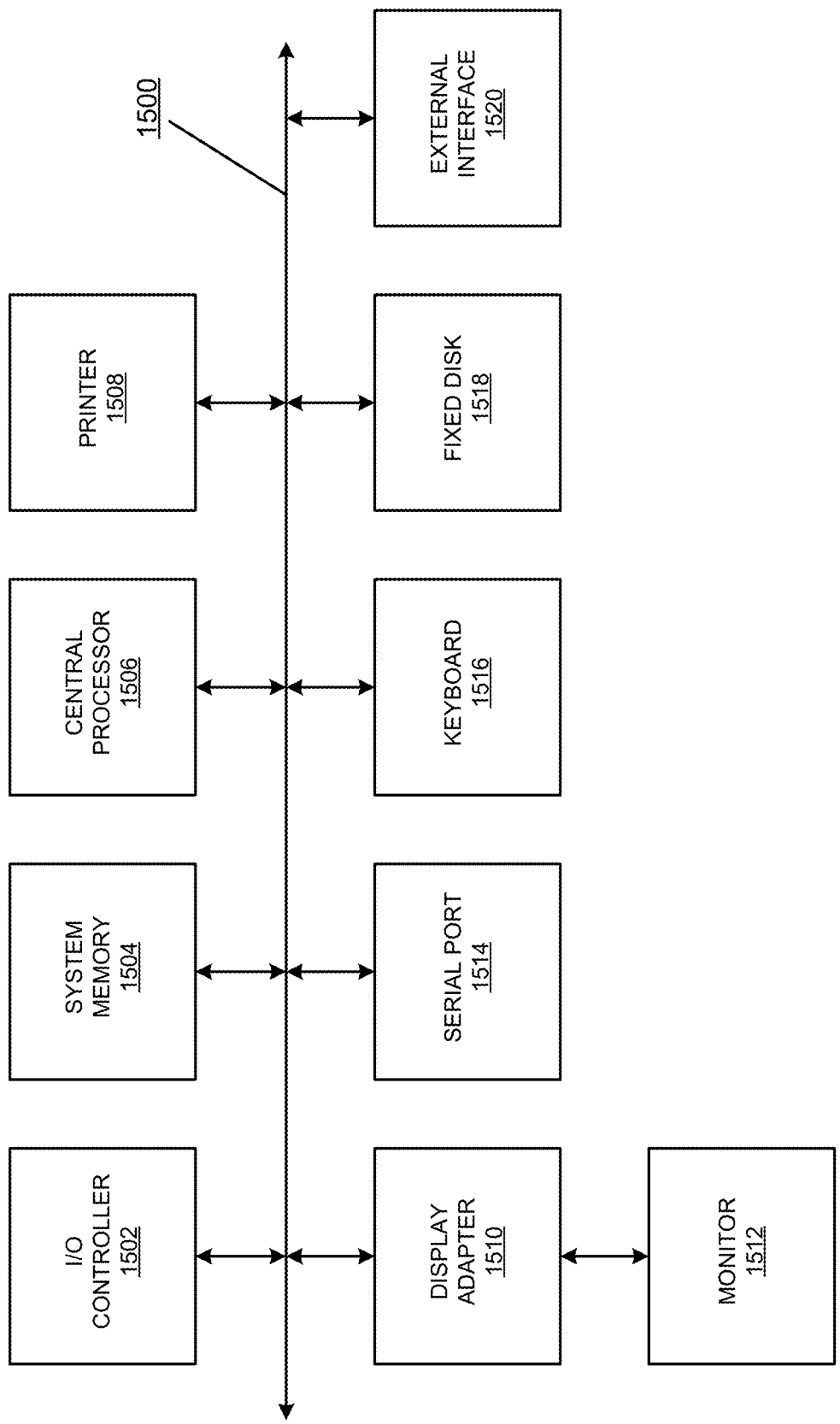
FIG. 15 illustrates a block diagram of an exemplary computer apparatus.

Examples of such subsystems or components are shown in FIG. 15 which illustrates exemplary computer apparatus 1500. The subsystems shown in FIG. 15 are interconnected via a system bus 1502. Additional subsystems such as a printer 1510, keyboard 1516, fixed disk 1518 (or other memory comprising computer readable media), monitor 1522, which is coupled to a display adapter 1512, and others are shown. Peripherals and input/output (I/O) devices, which couple to I/O controller 1504 (which can be a processor or other suitable controller), can be connected to the computer system by any number of means known in the art, such as a serial port 1514. For instance, serial port 1514 or an external interface 1520 can be used to connect computer apparatus 1500 to a wide area network such as the Internet, a mouse input device, or a scanner. The interconnection via system bus 1502 allows a central processor 1508 to communicate with each subsystem and to control the execution of instructions from a system memory 1506 or fixed disk 1518, as well as the exchange of information between subsystems. System memory 1506 and/or fixed disk 1518 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising, performing by a server computer:

accessing a database to retrieve a plurality of requesting computers that have been registered with a transport computer, wherein, for each of the plurality of requesting computers, the transport computer is networked to a requesting computer and configured to process authorization request messages for the requesting computer;

causing a list of the plurality of requesting computers to be displayed at a client computer;

receiving, from the client computer, a selection from the list of the plurality of requesting computers, thereby providing a selected requesting computer;
causing a first setting, which represents a rule that controls which authorization request messages from the selected requesting computer are forwarded to the transport computer, to be displayed at the client computer, wherein the first setting references one or more first attributes that distinguish a subset of authorization request messages from other authorization request messages;
responsive to receiving a first selection of the first setting from the client computer, accessing the database to modify the rule in accordance with the first setting;
receiving a first authorization request message that is characterized by one or more second attributes from the selected requesting computer;
responsive to receiving the first authorization request message:
  using the first authorization request message to access a set of rules that control which authorization request messages from the selected requesting computer are forwarded to the transport computer; and
  processing the first authorization request message in accordance with the set of rules, which comprises processing the first authorization request message in accordance with a first protocol in response to determining that the first authorization request message is characterized by the one or more second attributes,
wherein processing the first authorization request message in accordance with the first protocol comprises transmitting an authorization response message to the selected requesting computer without forwarding the first authorization request message to the transport computer.

2. The method of claim 1, wherein the rule that controls which authorization request messages from the selected requesting computer are forwarded to the transport computer is received from the transport computer.

3. The method of claim 1, wherein the rule that controls which authorization request messages from the selected requesting computer are forwarded to the transport computer is received from a transaction processing entity.

4. The method of claim 1, wherein the rule that controls which authorization request messages from the selected requesting computer are forwarded to the transport computer declines requests to access a resource, where the requests are associated with a particular user identifier.

5. The method of claim 1, wherein the authorization response message indicates that a request to access a resource for which the first authorization request message was transmitted is declined.

6. The method of claim 1, wherein the first setting is associated with a plurality of settings, and the plurality of settings further comprises a second setting that references user identifiers that are assigned by a resource computer that is associated with the transport computer; and
  wherein the method further comprises:
    responsive to receiving a second selection of the second setting from the client computer, accessing the database to modify the set of rules in accordance with the plurality of settings;
    receiving, from the selected requesting computer, a second authorization request message that is transmitted on behalf of a request to access a resource that is associated with a user identifier that is assigned by the resource computer; and
    responsive to receiving the second authorization request message, processing the second authorization request message in accordance with the set of rules, which comprises processing the second authorization request message in accordance with a second protocol in response to determining that the request is associated with the user identifier that is assigned by the resource computer.

7. The method of claim 1, wherein information from the database associated with the plurality of requesting computers includes an identifier of a venue associated with the requesting computer and a name of the venue associated with the requesting computer.

8. A server computer comprising:
  a processor; and
  a computer-readable medium coupled to the processor, the computer-readable medium including code executable by the processor for performing a method comprising:
    accessing a database to retrieve a plurality of requesting computers that have been registered with a transport computer, wherein, for each of the plurality of requesting computers, the transport computer is networked to a requesting computer and configured to process authorization request messages for the requesting computer;
    causing a list of the plurality of requesting computers to be displayed at a client computer;
    receiving, from the client computer, a selection from the list of the plurality of requesting computers, thereby providing a selected requesting computer;
    causing a first setting, which represents a rule that controls which authorization request messages from the selected requesting computer are forwarded to the transport computer, to be displayed at the client computer, wherein the first setting references one or more first attributes that distinguish a subset of authorization request messages from other authorization request messages;
    responsive to receiving a first selection of the first setting from the client computer, accessing the database to modify the rule in accordance with the first setting;
    receiving a first authorization request message that is characterized by one or more second attributes from the selected requesting computer;
    responsive to receiving the first authorization request message:
      using the first authorization request message to access a set of rules that control which authorization request messages from the selected requesting computer are forwarded to the transport computer; and
      processing the first authorization request message in accordance with the set of rules, which comprises processing the first authorization request message in accordance with a first protocol in response to determining that the first authorization request message is characterized by the one or more second attributes,
    wherein processing the first authorization request message in accordance with the first protocol comprises transmitting an authorization response message to the selected requesting computer without forwarding the first authorization request message to the transport computer.

9. The server computer of claim 8, wherein the rule that controls which authorization request messages from the selected requesting computer are forwarded to the transport computer is received from the transport computer.

10. The server computer of claim 8, wherein the rule that controls which authorization request messages from the selected requesting computer are forwarded to the transport computer is received from a transaction processing entity.

11. The server computer of claim 8, wherein the rule that controls which authorization request messages from the selected requesting computer are forwarded to the transport computer declines requests to access a resource, where the requests are associated with a particular user identifier.

12. The server computer of claim 8, wherein the authorization response message indicates that a request to access a resource for which the first authorization request message was transmitted is declined.

13. The server computer of claim 8, wherein the first setting is associated with a plurality of settings, and the plurality of settings further comprises a second setting that references user identifiers that are assigned by a resource computer that is associated with the transport computer; and wherein the method further comprises:

responsive to receiving a second selection of the second setting from the client computer, accessing the database to modify the set of rules in accordance with the plurality of settings;

receiving, from the selected requesting computer, a second authorization request message that is transmitted on behalf of a request to access a resource that is associated with a user identifier that is assigned by the resource computer; and responsive to receiving the second authorization request message, processing the second authorization request message in accordance with the set of rules, which comprises processing the second authorization request message in accordance with a second protocol in response to determining that the request is associated with the user identifier that is assigned by the resource computer.

14. The server computer of claim 8, wherein information from the database associated with the plurality of requesting computers includes an identifier of a venue associated with the requesting computer and a name of the venue associated with the requesting computer.

15. A method comprising:

receiving, by a client computer from a server computer, a list of a plurality of requesting computers, wherein the server computer accesses a database to retrieve the plurality of requesting computers that have been registered with a transport computer, wherein for each of the plurality of requesting computers, the transport computer is networked to a requesting computer and configured to process authorization request messages for the requesting computer;

displaying, by the client computer, a list of a plurality of requesting computers;

selecting, by the client computer, the requesting computer from the list of requesting computers;

receiving, from the server computer, a plurality of settings which represent a set of rules that control which authorization request messages from the selected requesting computer are forwarded to the transport computer, wherein the plurality of settings are modifiable and comprise a first setting that references one or more attributes that distinguishes a subset of authorization request messages from other authorization request messages;

receiving a first selection of the first setting; and transmitting the first selection of the first setting to the server computer, thereby causing the server computer to access the database to modify a rule in accordance with the first setting, receive a first authorization request message that is characterized by one or more second attributes from the selected requesting computer, responsive to receiving the first authorization request message, causes the server computer to use the first authorization request message to access the set of rules that control which authorization request messages from the selected requesting computer are forwarded to the transport computer, wherein the server computer is configured to evaluate the set of rules in response to receiving the first authorization request message that is characterized by the one or more attributes from the selected requesting computer, wherein the evaluating causes an authorization response message to be transmitted to the selected requesting computer without the first authorization request message being forwarded to the transport computer.

16. The method of claim 15, wherein the authorization response message indicates that a request to access a resource for which the first authorization request message was transmitted is declined.

17. The method of claim 15, wherein the authorization response message complies with ISO 8583 standard.

18. The method of claim 15, wherein the first selection of the first setting is received in response to detecting a number of fraudulent transaction that involve foreign debit accounts.

19. The method of claim 15, wherein the first selection of the first setting is received from an administrator account.

20. The method of claim 15, wherein the set of rules are configured to a specific merchant.

* * * * *